US 012056314B2

United States Patent
Van Ostrand et al.

(10) Patent No.: US 12,056,314 B2
(45) Date of Patent: Aug. 6, 2024

(54) DATA DRIVE INPUT CIRCUIT

(71) Applicant: SigmaSense, LLC., Wilmington, DE (US)

(72) Inventors: Daniel Keith Van Ostrand, Leander, TX (US); Gerald Dale Morrison, Redmond, WA (US); Richard Stuart Seger, Jr., Belton, TX (US); Timothy W. Markison, Mesa, AZ (US)

(73) Assignee: SigmaSense, LLC., Austin, TX (US)

( * ) Notice: Subject to any disclaimer, the term of this patent is extended or adjusted under 35 U.S.C. 154(b) by 0 days.

(21) Appl. No.: 18/214,240

(22) Filed: Jun. 26, 2023

(65) Prior Publication Data

US 2023/0333694 A1    Oct. 19, 2023

Related U.S. Application Data

(63) Continuation of application No. 17/653,602, filed on Mar. 4, 2022, now Pat. No. 11,720,208, which is a
(Continued)

(51) Int. Cl.
*G06F 3/042* (2006.01)
*G06F 3/0488* (2022.01)
*G09G 3/3225* (2016.01)

(52) U.S. Cl.
CPC ............ *G06F 3/042* (2013.01); *G06F 3/0488* (2013.01); *G09G 3/3225* (2013.01);
(Continued)

(58) Field of Classification Search
CPC ..... G06F 3/042; G06F 3/0488; G09G 3/3225; G09G 2310/066; G09G 2320/0606; G09G 2360/144; G09G 2370/18
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 102106086 A | 6/2011 |
| CN | 103995626 A | 8/2014 |

(Continued)

OTHER PUBLICATIONS

China National Intellectual Property Administration; Office Action and Search Report; Application No. 202080048343.9; Aug. 1, 2023; 14 pgs.

(Continued)

*Primary Examiner* — Afroza Chowdhury
(74) *Attorney, Agent, or Firm* — GARLICK & MARKISON; Timothy W. Markison

(57) ABSTRACT

A data drive input circuit includes a pulse width modulation (PWM) module operable to generate a PWM signal based on input data and a clock signal. The data drive input circuit further includes a mode enable module operable to establish a light emitting diode (LED) transmit mode of a mode signal when the PWM signal is in a first state and establish an LED receive mode of the mode signal when the PWM signal is in a second state. The data drive input circuit further includes a transmit/receive drive module operable to generate a transmit data signal component of an analog input signal based on the PWM signal and the LED transmit mode generate a receive signal component of the analog input signal based on the PWM signal and the LED receive mode and output the analog input signal.

7 Claims, 28 Drawing Sheets

Related U.S. Application Data continuation of application No. 17/223,613, filed on Apr. 6, 2021, now Pat. No. 11,269,458, which is a continuation of application No. 16/403,200, filed on May 3, 2019, now Pat. No. 11,029,782.

(52) U.S. Cl.
CPC .............. *G09G 2310/066* (2013.01); *G09G 2320/0606* (2013.01); *G09G 2360/144* (2013.01); *G09G 2370/18* (2013.01)

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 10,541,280 B1 | 1/2020 | Krah |
| 11,029,782 B2 | 6/2021 | Van Ostrand |
| 2003/0052657 A1 | 3/2003 | Koernle et al. |
| 2005/0235758 A1 | 10/2005 | Kowal et al. |
| 2007/0035707 A1 | 2/2007 | Margulis |
| 2007/0195022 A1 | 8/2007 | Maede |
| 2011/0063154 A1 | 3/2011 | Hotelling et al. |
| 2011/0210946 A1 | 9/2011 | Goertz |
| 2011/0233566 A1 | 9/2011 | Okubo |
| 2011/0298745 A1 | 12/2011 | Souchkov |
| 2012/0278031 A1 | 11/2012 | Oda |
| 2013/0278447 A1 | 10/2013 | Kremin |
| 2014/0092075 A1* | 4/2014 | Lee .................. G05F 1/468 |
| | | 345/212 |
| 2014/0139492 A1 | 5/2014 | Liu |
| 2014/0327644 A1 | 11/2014 | Mohindra |
| 2015/0091847 A1 | 4/2015 | Chang |
| 2015/0221259 A1* | 8/2015 | Soto .................. G09G 3/3406 |
| | | 315/153 |
| 2015/0346889 A1 | 12/2015 | Chen |
| 2015/0348504 A1 | 12/2015 | Sakariya |
| 2016/0188049 A1 | 6/2016 | Yang et al. |
| 2017/0024080 A1 | 1/2017 | King-Smith |
| 2018/0157354 A1 | 6/2018 | Blondin et al. |
| 2018/0275824 A1 | 9/2018 | Li |
| 2019/0050075 A1 | 2/2019 | Reynolds |
| 2019/0074324 A1 | 3/2019 | Kim |
| 2019/0087042 A1 | 3/2019 | Van Ostrand |

FOREIGN PATENT DOCUMENTS

| | | |
|---|---|---|
| CN | 104182105 A | 12/2014 |
| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

International Searching Authority; International Search Report and Written Opinion; International Application No. PCT/US2020/030259; Jul. 22, 2020; 10 pgs.

European Patent Office; Extended European Search Report; Application No. 19853507.2; Jun. 13, 2023; 7 pgs.

* cited by examiner

LED in zero bias condition 10

LED in forward bias condition 22

LED in reverse bias condition 28

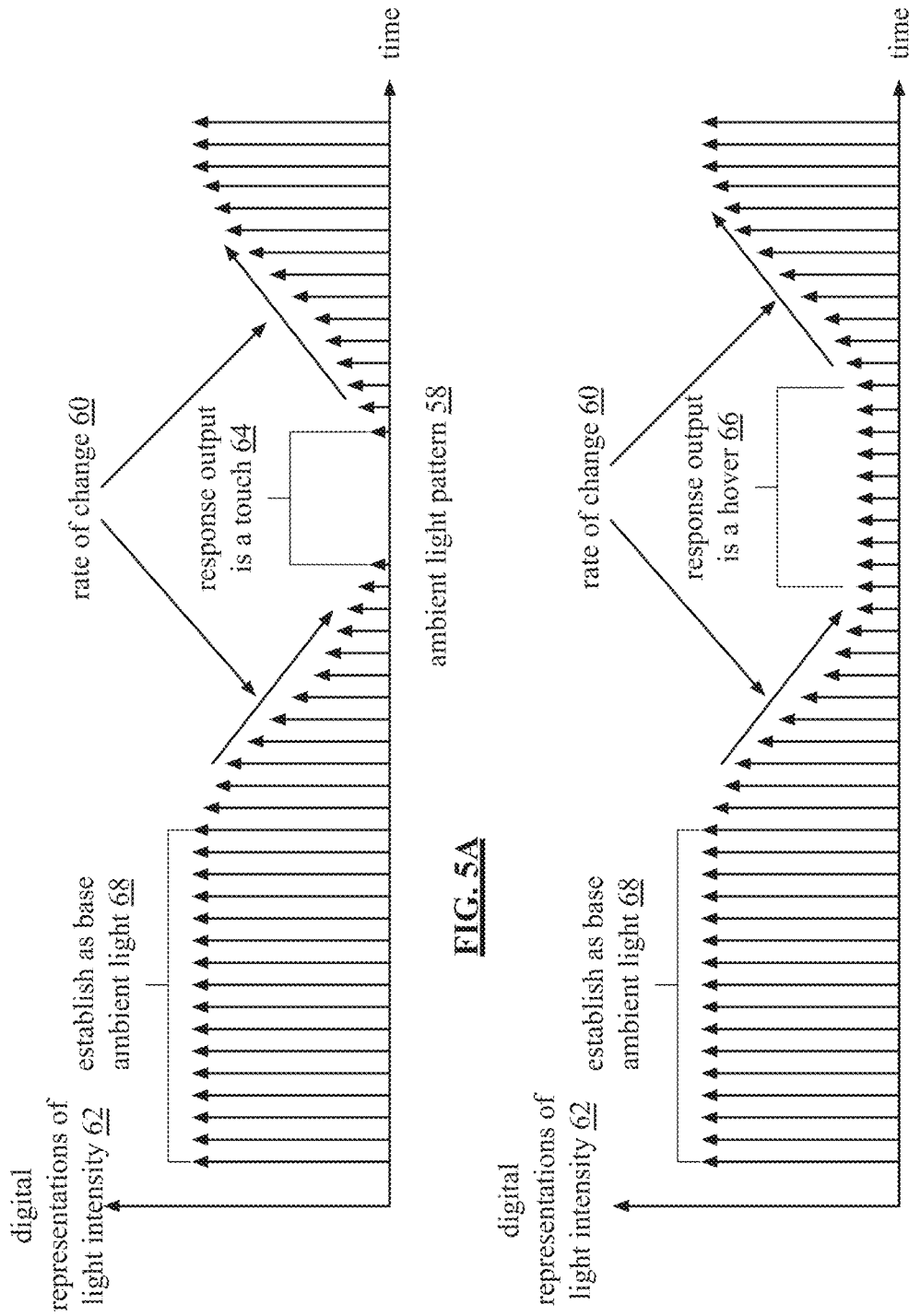

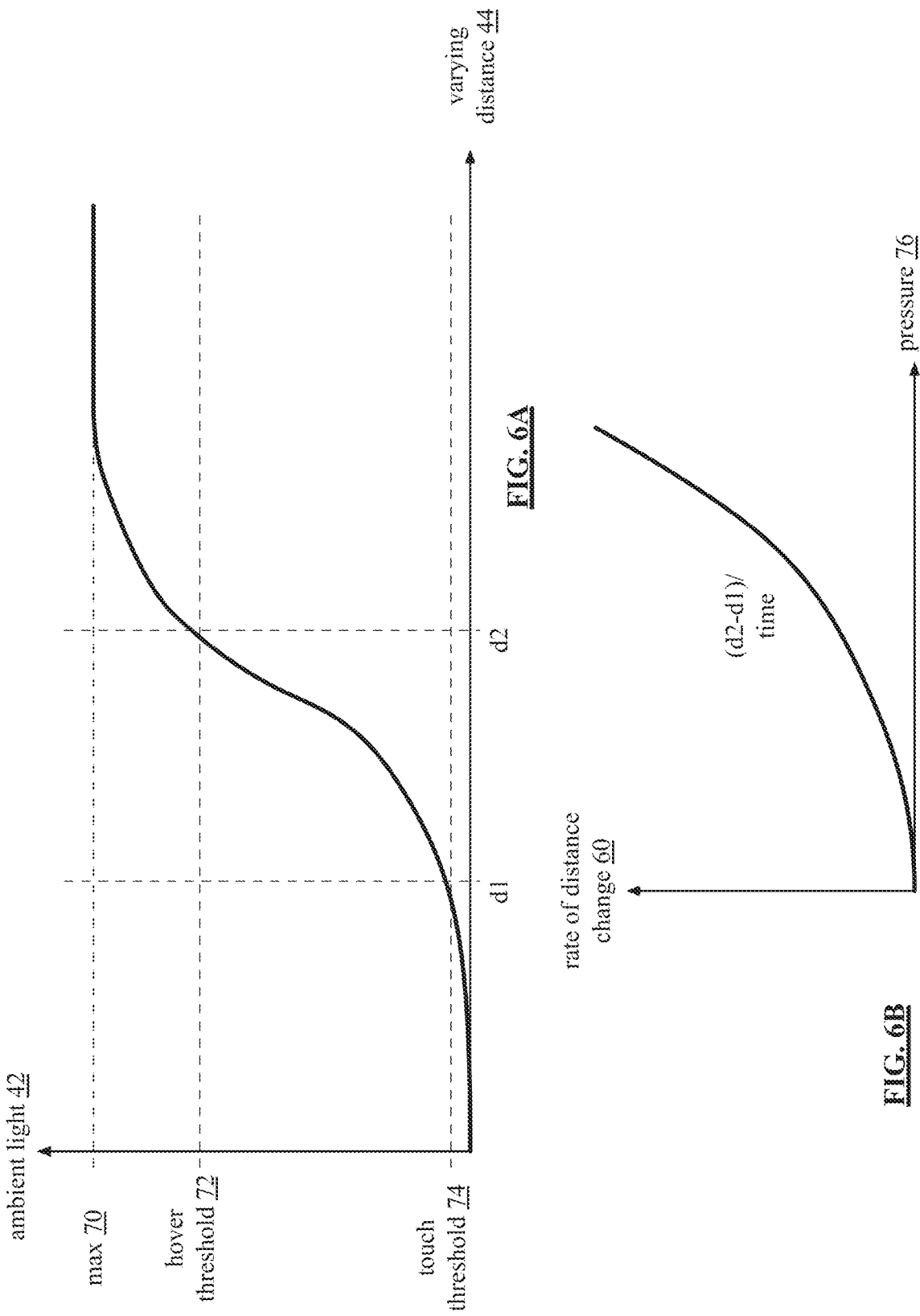

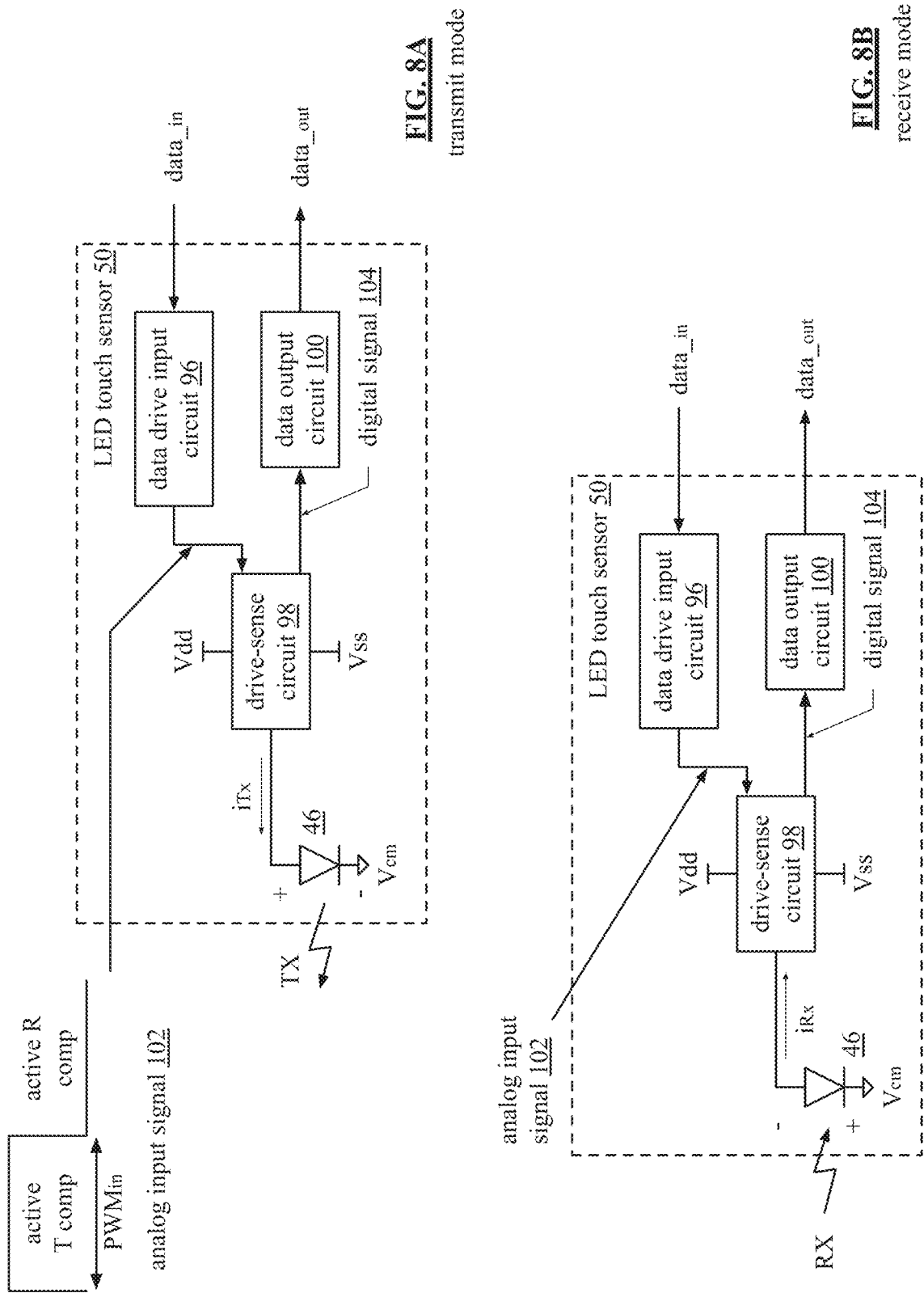

receive mode transmit mode receive mode transmit mode

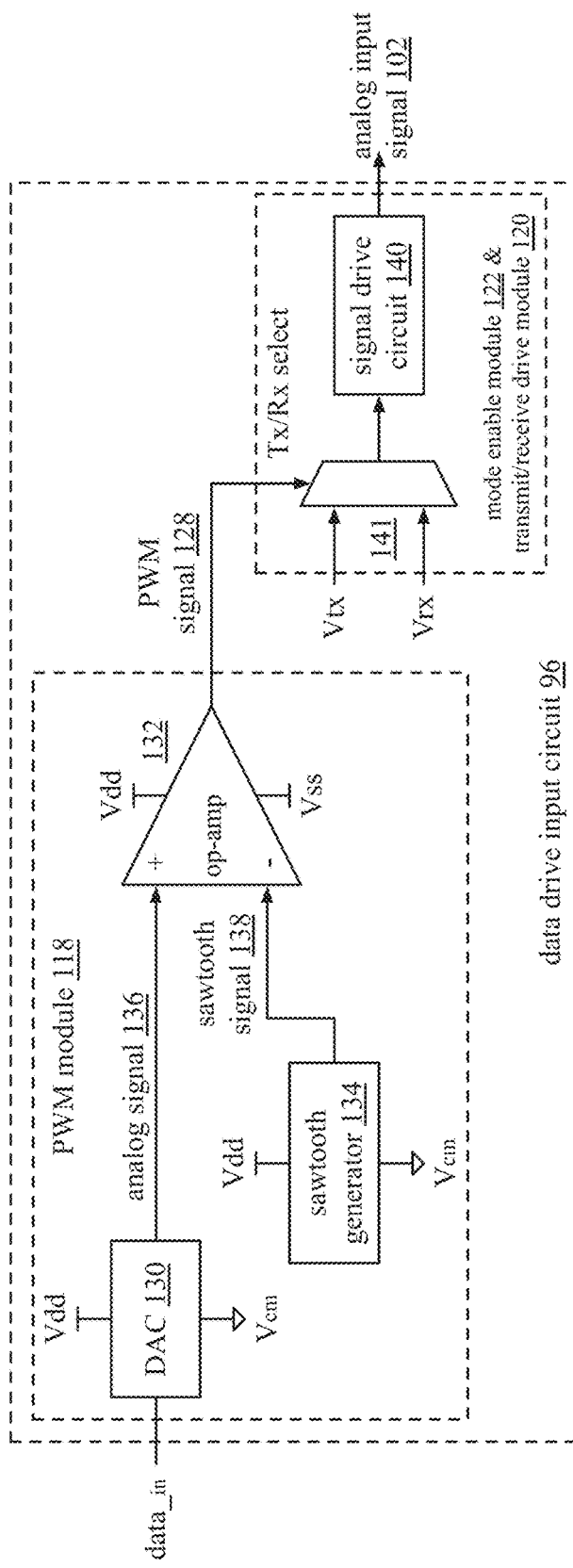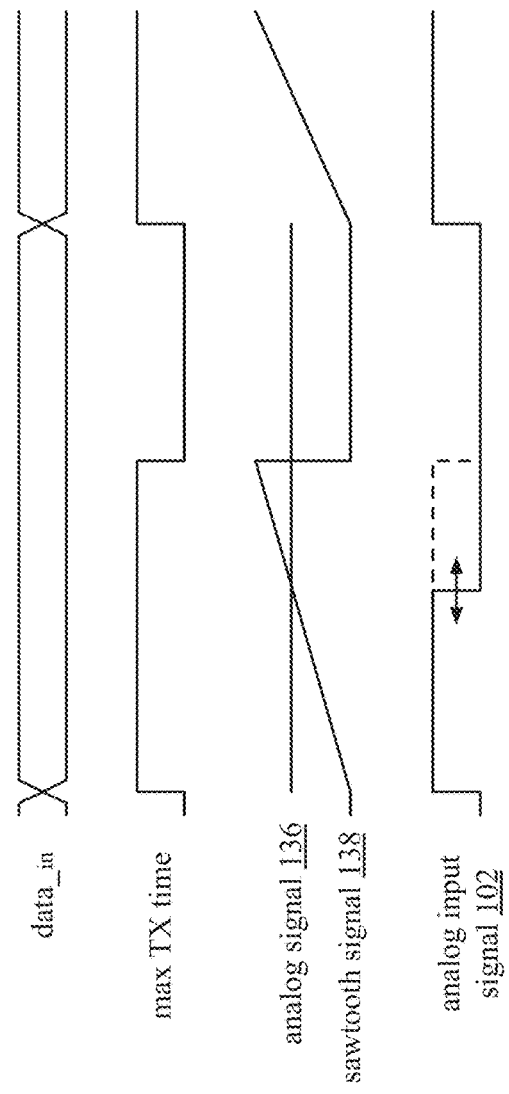
FIG. 11B phase locked loop (PLL) 180

DATA DRIVE INPUT CIRCUIT

CROSS-REFERENCE TO RELATED APPLICATIONS

The present U.S. Utility Patent Application claims priority pursuant to 35 USC § 120 as a continuation of U.S. Utility application Ser. No. 17/653,602, entitled "RGB LED TOUCH PANEL AND DRIVE SENSE CIRCUIT", filed Mar. 4, 2022, which is a continuation of U.S. Utility application Ser. No. 17/223,613, entitled "DRIVE SENSE CIRCUIT FOR AN LED TOUCH PANEL", filed Apr. 6, 2021, issued as U.S. Pat. No. 11,269,458 on Mar. 8, 2022, which is a continuation of U.S. Utility application Ser. No. 16/403,200, entitled "LIGHT EMITTING DIODE (LED) TOUCH DISPLAY CIRCUIT", filed May 3, 2019, issued as U.S. Pat. No. 11,029,782 on Jun. 8, 2021, all of which are hereby incorporated herein by reference in their entirety and made part of the present U.S. Utility Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIGS. 5A-5B are schematic block diagrams of examples of generating a response output in accordance with the present invention;

FIGS. 6A-6B are examples of determining an interaction based on ambient light level and distance of an object in accordance with the present invention;

FIGS. 8A-8B are schematic block diagrams of a light emitting diode (LED) touch sensor in accordance with the present invention;

FIGS. 11A-11C are schematic block diagrams of embodiments of a data drive input circuit in accordance with the present invention;

Figure 18:
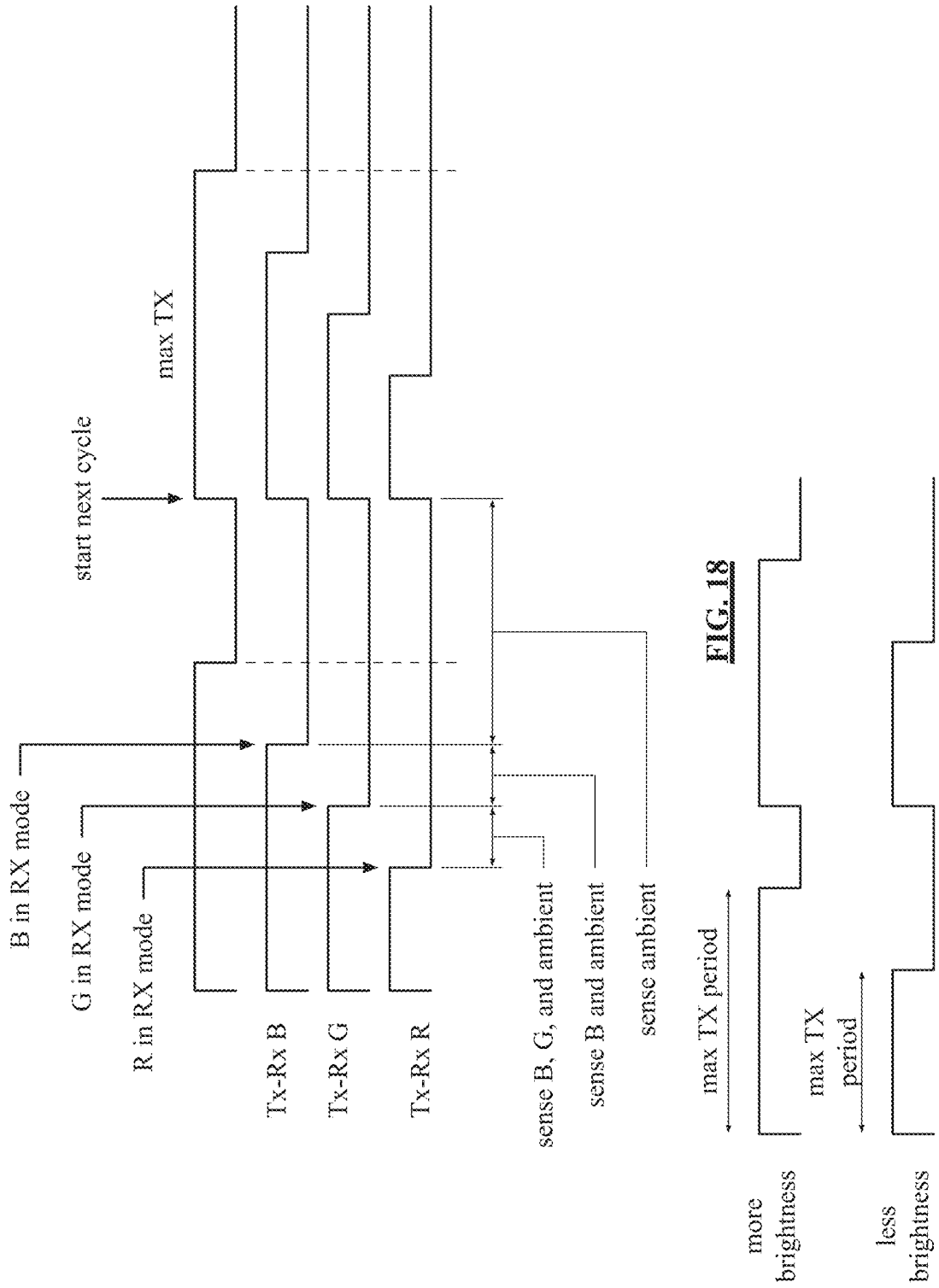
Figure 19:
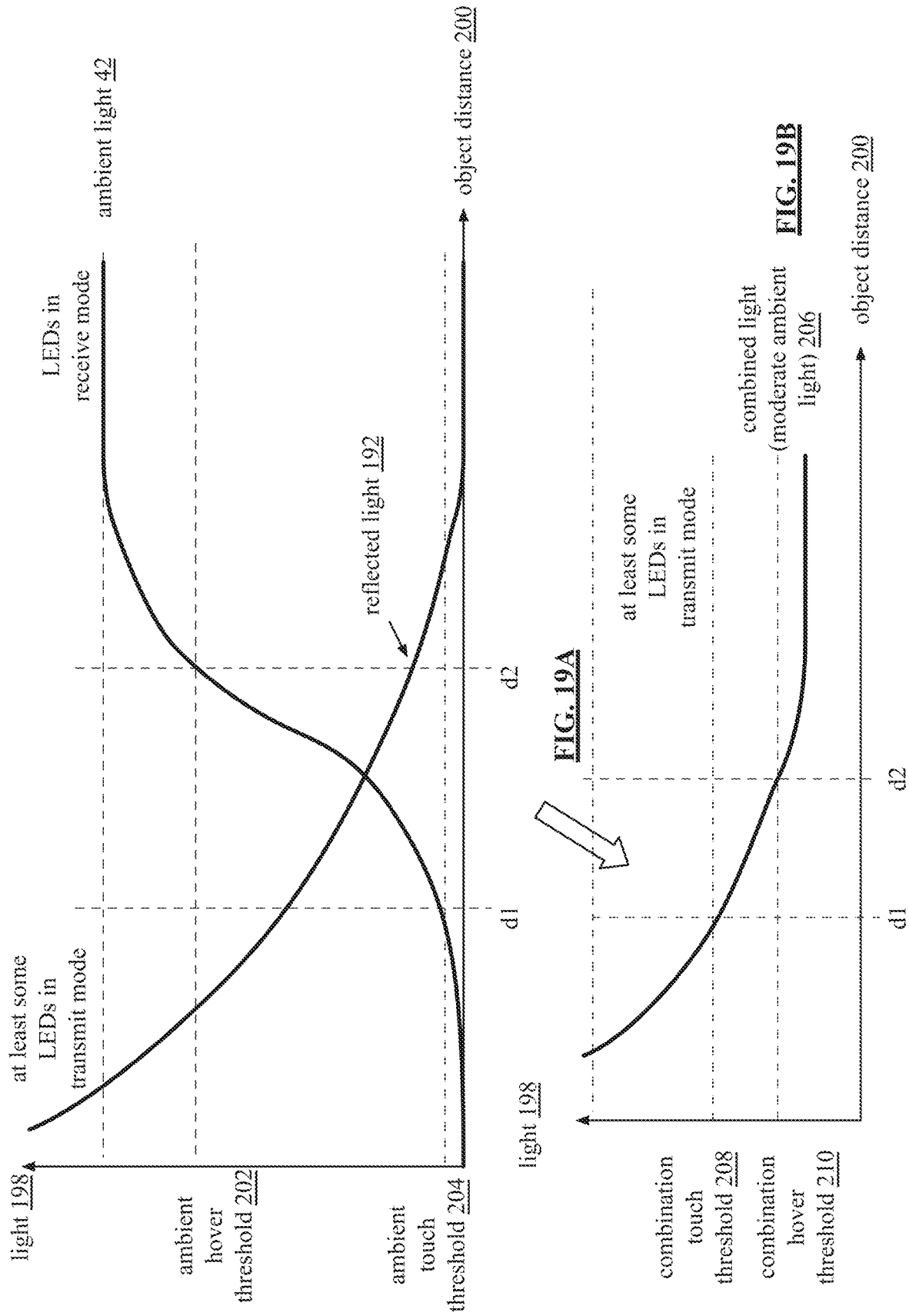
Figure 20:
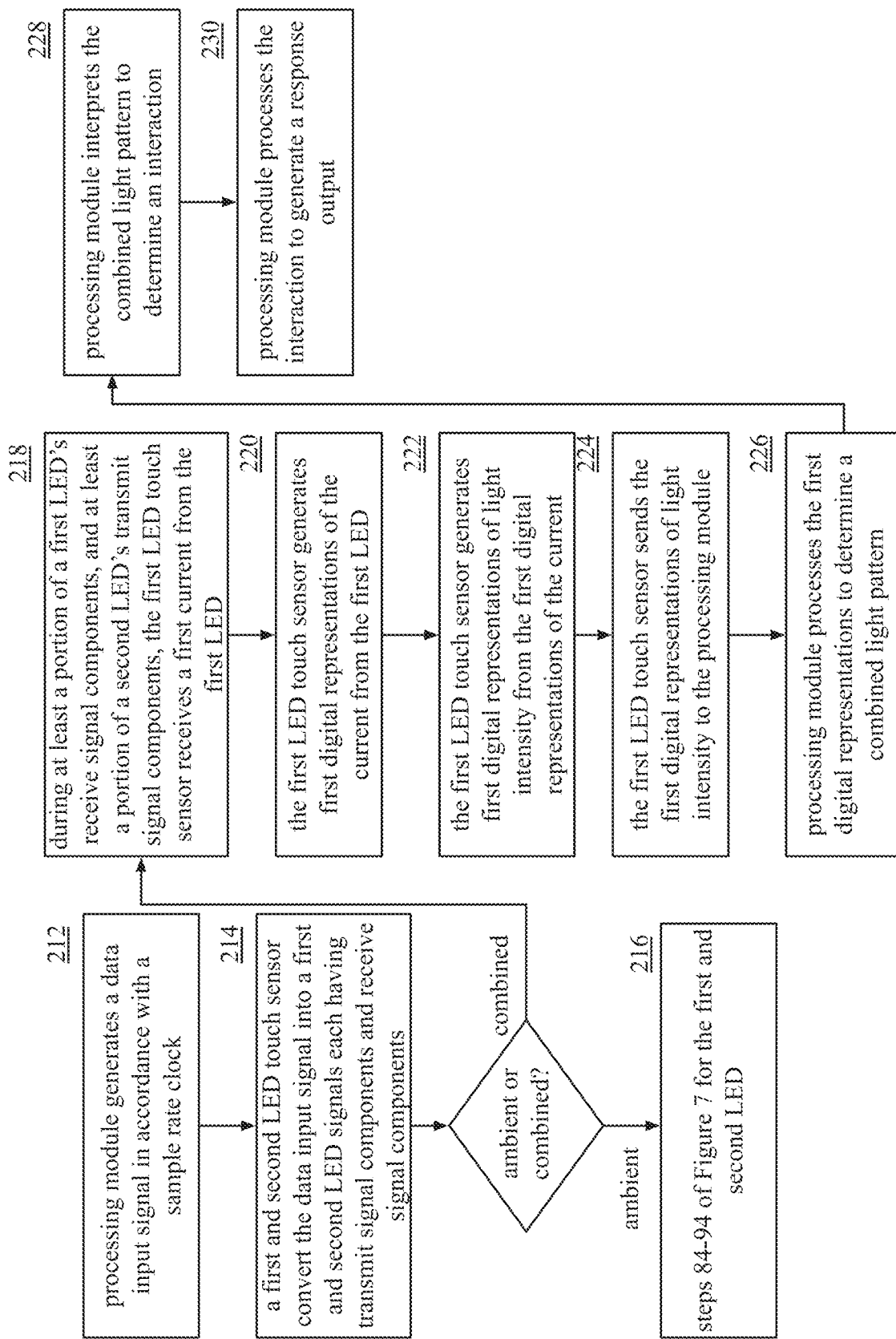

FIG. 18 is a schematic block diagram of an example of transmit and receive select signals of light emitting diodes (LEDs) in accordance with the present invention FIGS. 19A-19B depict graphs of light versus object distance in accordance with the present invention; and FIG. 20 is a logic diagram of an example of a method of light based touch detection by a light emitting diode (LED) touch display circuit in accordance with the present invention.

DETAILED DESCRIPTION OF THE INVENTION

Figure 1A:
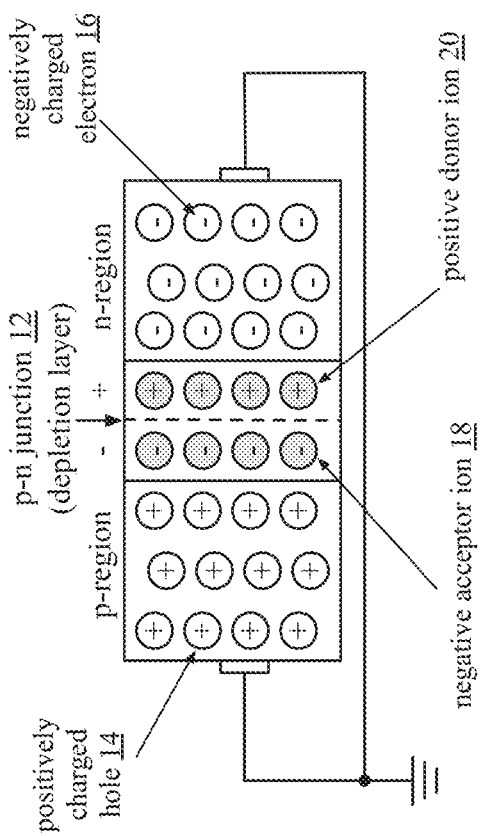
FIGS. 1A-1C are schematic block diagrams of examples of light emitting diode (LED) biasing conditions.
Figure 1B:
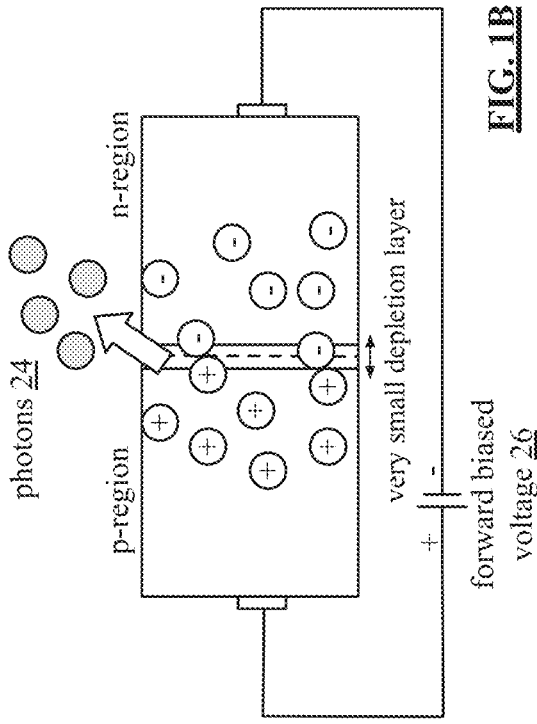
Figure 1C:
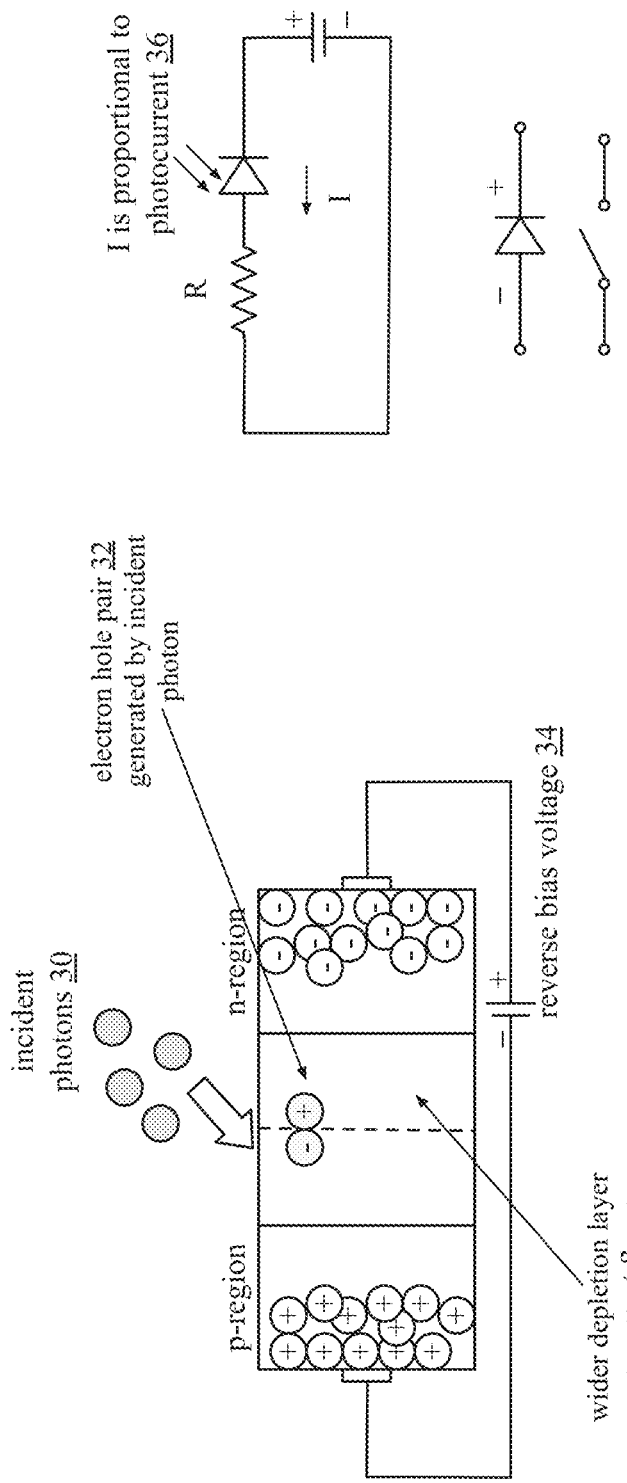

FIGS. 1A-1C are schematic block diagrams of examples of light emitting diode (LED) biasing conditions. An LED is a semiconductor diode that consists of p-type and n-type semiconducting materials placed in contact with each other creating a p-n junction 12. N-type semiconducting material is doped with donors that contribute free electrons while p-type semiconducting material is doped with acceptors that create deficiencies of electrons or positively charged holes.

FIG. 1A depicts an example of an LED in a zero bias condition 10. A zero bias condition is when no external potential energy is applied to the p-n junction 12. When the n-type and p-type materials (e.g., creating p-region and n-region) are first joined, negatively charged free electrons 16 from the donor atoms migrate across the p-n junction 12 to fill positively charged holes 14 in the p-region leaving behind positively charged donor ions 20. Holes 14 from the acceptor atoms in the p-region migrate across the p-n junction 12 in the opposite direction towards the free electrons leaving behind negatively charged acceptor ions 18.

As a result, the charge density of the p-region along the p-n junction 12 is filled with negatively charged acceptor ions 18 and the charge density of the n-region along the junction is filled with positively charged donor ions 20. This process repeats back and forth until the number of electrons which have crossed the junction have a large enough electrical charge to prevent any more electrons or holes from crossing over the junction. Eventually a state of equilibrium occurs producing a natural potential barrier zone around the p-n junction 12 where the p-n junction is depleted of free carriers (e.g., free electrons and holes). Thus, this area around the p-n junction 12 is referred to as the depletion layer.

FIG. 1B depicts an example of an LED in a forward bias condition 22. When an LED is connected in a forward bias condition, a negative voltage is applied to the n-region and a positive voltage is applied to the p-region. If this external voltage becomes greater than the potential barrier (e.g., common values for threshold voltage lie between 0.6 and 1.4 volts), the potential barrier's opposition will be overcome and current will begin to flow as the negative voltage repels electrons towards the p-n junction 12 giving them energy to cross over and combine with positively charged holes.

The application of the forward biased voltage 26 results in the depletion layer becoming very small creating a low impedance path through the p-n junction 12 and allowing high currents to flow. Since the LED can conduct "infinite" current when forward biasing is above the voltage threshold, the LED effectively becomes a short circuit in the forward bias condition and resistors are typically used in series to limit its current flow.

In conventional diodes, when electrons combine with holes, energy in the form of heat it released. However, due to the semi-conductive materials chosen for LEDs, for each recombination of a negative and positive charge, a quantum of electromagnetic energy is released in the form of a photon 24 of light. The color of an LED depends on the combination of semiconductor materials used and the energy gaps (e.g., the amount of energy needed to move an electron from the valence band of an atom into its conductance band) of the p and n regions.

The more energy the electrons lose in this process the higher the frequency (and shorter the wavelength) of the light produced. Different LED compounds emit light in specific regions of the visible light spectrum and therefore produce different intensity levels. The choice of the semiconductor material used determines the overall wavelength of the photon light emissions and therefore the resulting color of the light emitted. For example, to achieve a blue LED (e.g., a wavelength 430-505 nm) silicon carbide (SiC) is used.

FIG. 1C depicts an example of an LED in a reverse bias condition 28. When an LED is connected in a reverse bias condition, a positive voltage is applied to the n-region and a negative voltage is applied to the p-region. The positive voltage applied to the n-region attracts electrons towards the positive electrode and away from the p-n junction. Likewise, the negative voltage applied to the p-region attracts holes towards the negative electrode and away from the p-n junction. The depletion layer grows wider due to a lack of electrons and holes creating a high impedance path. The LED in reverse bias acts like an open circuit blocking the flow of current through the semiconductor material.

When an LED is operated in reverse bias mode, it can operate as a photodiode. In other words, instead of emitting light, the LED can detect light. For example, when the p-n junction is illuminated with light of a certain energy, incident photons 30 are absorbed and electron-hole pairs 32 are created. Due to the reverse bias, the electron-hole pairs drift apart. The movement of holes toward the negative electrode (anode) and electrons toward the positive electrode (cathode) produces a photocurrent 36. This process is known as the inner photoelectric effect.

LEDs detect a band of light that has a peak sensitivity at a wavelength slightly shorter than the peak wavelength they emit. For example, an LED with a peak emission in red at 660 nm has a peak detection of about 610 nm (e.g., orange light). LEDs used in near infrared remote controllers are AlGaAs devices with a peak emission of 880 nm and a peak detection of 820 nm.

Figure 2:
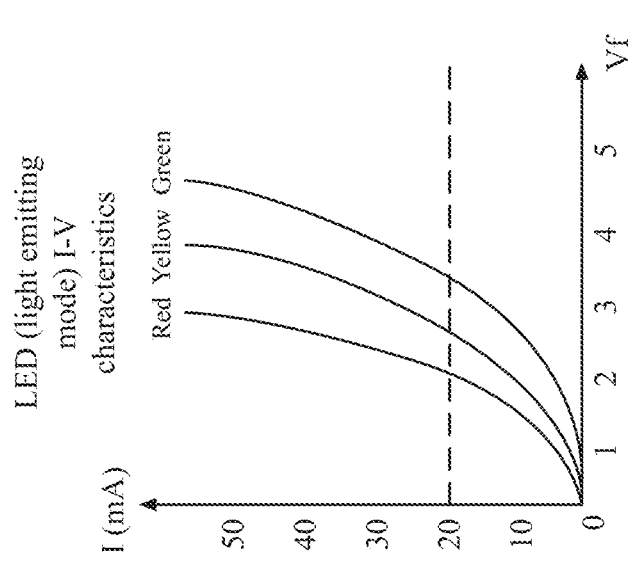
FIG. 2 is an example of the current-voltage (I-V) characteristics of light emitting diodes (LEDs) in a light emitting mode.

FIG. 2 is an example of the current-voltage (I-V) characteristics of light emitting diodes (LEDs) in a light emitting mode. In a forward bias condition, once forward operating voltage (Vf) is reached, current is "infinite" in an LED and forward current are controlled by other circuit elements.

Both the forward operating voltage (Vf) and forward current vary depending on the semiconductor materials used. Most common LEDs require a forward operating voltage of between 1.2 to 3.6 volts with a forward current rating of about 10 to 30 mA with 12 to 20 mA being the most common range. As shown, with a forward current set at 20 mA, the forward voltage of a red LED is 1.8 volts, the forward voltage of the yellow LED is 2.2 volts, and the forward voltage of the green LED is 3.5 volts.

The voltages and currents are typically less for mini-LEDs, micro-LEDs, and Organic LEDs (OLEDs) than they are for stand-alone LEDs. While currents and voltages are typically less, mini-LEDs, micro-LEDs, and OLEDs function in a similar manner to stand-alone LEDs as described above. As such, the concepts discussed herein are applicable to stand-alone LEDs, mini-LEDs, micro LEDs, and OLEDs. Note that a micro-LEDs generally refers to an LED that has a size less than 50 microns and mini LEDs refer to LEDs that have a size that is greater than 50 microns.

Figure 3:
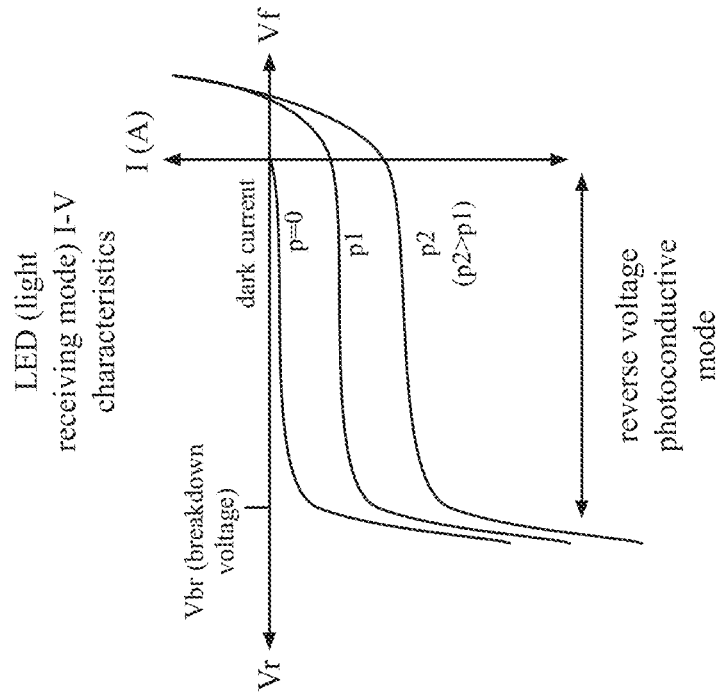
FIG. 3 is an example of the current-voltage (I-V) characteristics of light emitting diodes (LEDs) in a light receiving mode.

FIG. 3 is an example of the current-voltage (I-V) characteristics of light emitting diodes (LEDs) in a light receiving mode (e.g., operating as a photodiode) where "p" is optical power (e.g., light intensity) and where p2 is greater than p1. As previously discussed, to be in a light receiving mode, the LED is reversed biased. This is also known as operating in a photoconductive mode.

At zero optical power (e.g., p=0), the photocurrent (I) is almost zero except for a small dark current. Dark current is produced due to random generation of electrons and holes within the depletion layer of the LED even when no photons are entering the device. As shown, photocurrent is almost independent of applied reverse bias voltage (Vr) while the photocurrent varies almost linearly with incident light intensity/optical power. For example, as reverse current increases, optical power (p) increases. As the reverse bias voltage increases, there is a sharp increase in the photocurrent. This point is referred to as breakdown voltage (Vbr).

Figure 4:
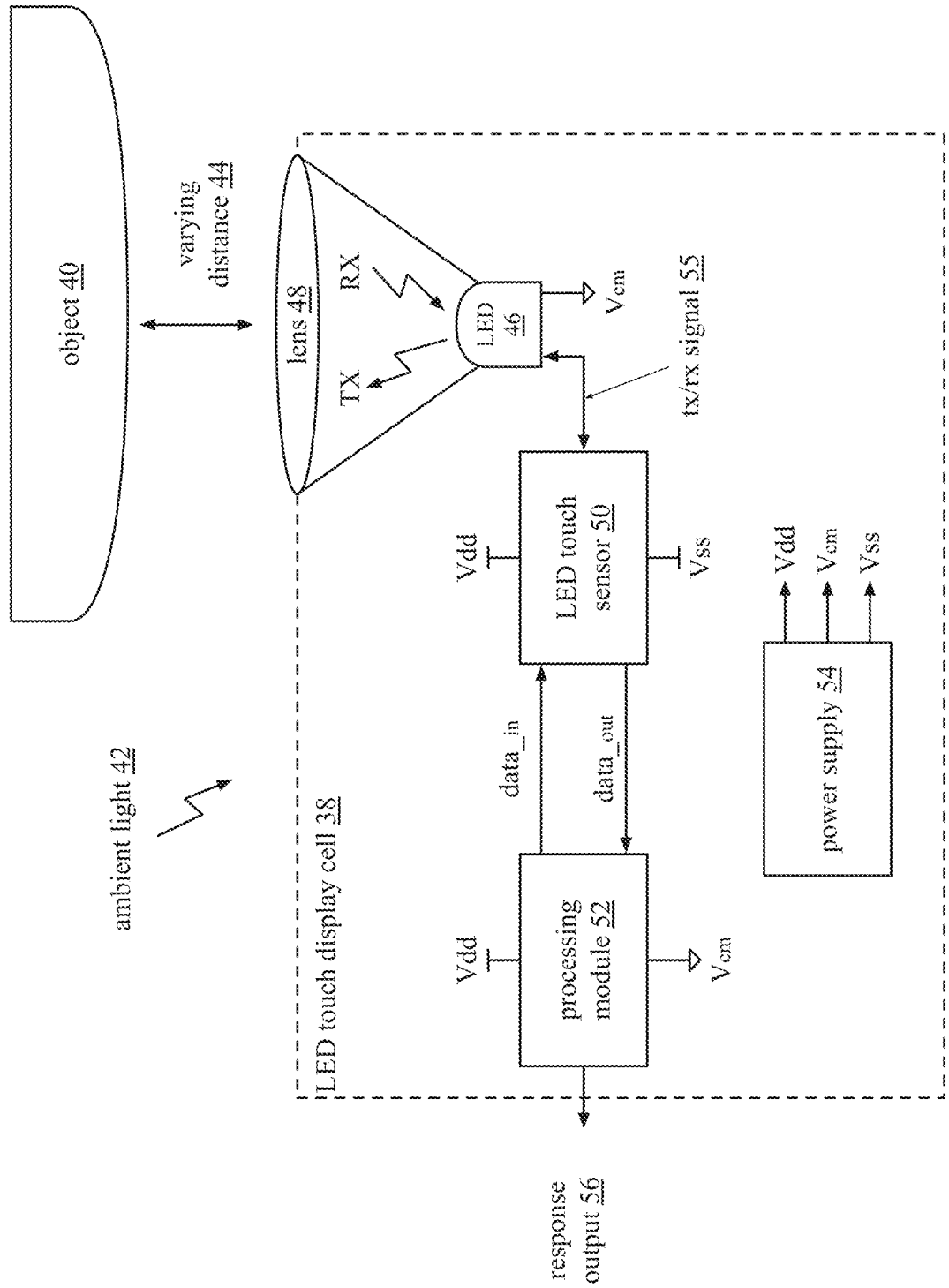
FIG. 4 is a schematic block diagram of an embodiment of a light emitting diode (LED) touch display cell in accordance with the present invention.

FIG. 4 is a schematic block diagram of an embodiment of a light emitting diode (LED) touch display cell 38 that includes LED 46, LED touch sensor 50, processing module 52, and power supply 54. The LED touch display cell 38 may further include a lens 48. The lens 48 includes one or more light distribution properties, light concentration properties, filters, color masks, embedded text elements, and can also serve as a protective layer for LED 46. The LED touch display cell 38 may further include a shutter associated with the lens 48 to control light emissions and/or light receptions.

The processing module 52 is a stand-alone device and/or part of a computing device. A computing device is a portable computing device and/or a fixed computing device. A portable computing device includes a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device is a computer (PC), a computer server, a cable set-top box, a satellite receiver, a television set, a printer, a fax machine, home entertainment equipment, a video game console, and/or any type of home or office computing equipment that is relatively stationary.

The power supply 54 supplies may be implemented in a variety of ways to produce a positive voltage Vdd, a negative voltage Vss, and a common mode voltage Vcm (e.g., Vcm=0 volts). For example, the power supply 54 is a DC-DC converter using a buck topology, a boost topology, a buck-boost topology, a fly-back topology, and/or a half-bridge topology. As another example, the power supply 54 includes one or more pairs of a batteries, where a pair of batteries is coupled in series with the common node providing Vcm.

The LED touch display cell 38 is operable to both emit light and sense ambient light 42 and can be used in a variety of ways. For example, the LED touch display cell 38 is used as a button and/or switch (e.g., on/off, dimmer) on any device such as a fan, an air filter, a computing device, etc. As another example, a plurality of LED touch display cells is used in a touch screen display. As yet another example, an LED touch display cell 38 is used as a near proximity motion detector.

In an example of operation, the LED touch sensor 50 generates a transmit signal component of a transmit-receive (tx/rx) signal 55 based on a digital input (e.g., data_in) signal at a sample clock rate received from processing module 52. The LED touch sensor 50 further operates to produce a digital data output (data_out) based on a receive signal component of the transmit-receive signal 55. The transmit-receive signal 55 is a repetitive signal that alternates between the transmit signal components and the receive signal components. The transmit signal component establishes a transmit mode and drives the LED 46 to a desired light intensity, which is based on the type of LED, the current being supplied, the voltage being supplied, the duration of being in the transmit mode, and the duty cycle of the transmit-receive signal 55. The receive signal component establishes a receive mode and corresponds to an amount of light being received by the LED 46.

When the transmit signal component is active, the LED touch sensor 50 forward biases the LED in accordance with a light intensity value (e.g., a pulse width modulation (PWM) signal where the pulse width corresponds the light intensity value) of the transmit signal component such that the LED 48 emits light and illuminates lens 48.

As an object 40 approaches the lens 48, the light emitted by the LED is reflected back. As more and more emitted light is reflected back, the properties of the LED change. For instance, the forward bias voltage for a given current level changes (e.g., increases). The LED touch sensor 50 generates a digital representation of the change in LED properties and outputs it as data_out to the processing module 52.

When the receive signal component is active, the LED touch sensor 50 reverse biases the LED such that the LED generates a current based on received light (e.g., ambient light 42). The LED touch sensor 50 generates a digital representation of the current and outputs it as data_out the processing module 52.

For example, when in a receive mode, the LED 46 senses ambient light 42 around the LED touch display cell 38. Based on a varying distance 44 of an object 40 (e.g., finger, pen, etc.) from the LED 46 and how that affects the amount of ambient light 42 received by the LED 46, the LED touch display cell 38 interprets object 40 interactions (e.g., a touch, hover, hover and gesture, etc.) with the LED touch display cell 38. For example, if an object 40 is touching and fully covers the lens 48, ambient light 42 will be blocked out by the interaction.

The processing module 52 receives the data_out, which includes a digital representation of the current produced by the LED when it's receiving light and includes a digital representation of changes in the LED properties when the LED is transmitting light. The processing module interprets the digital representation of the current to produce a digital representation of the intensity of the ambient light. The processing module 52 further processes the digital representation of the intensity of the ambient light to detect a touch, pressure of a touch, a hover, and/or a gesture. For example, the processing module determines a touch when a near-zero ambient light 42 is detected. As another example, the processing module determines a hover when the ambient light is less than a threshold level. As a further example, the processing module augments the ambient light determination with the changing LED properties due to reflected light during the transmit mode. The level of change in the LED properties corresponds to level of light being reflected. For instance, more light is reflected when the object is close than when the object is further away.

Figure 4A:
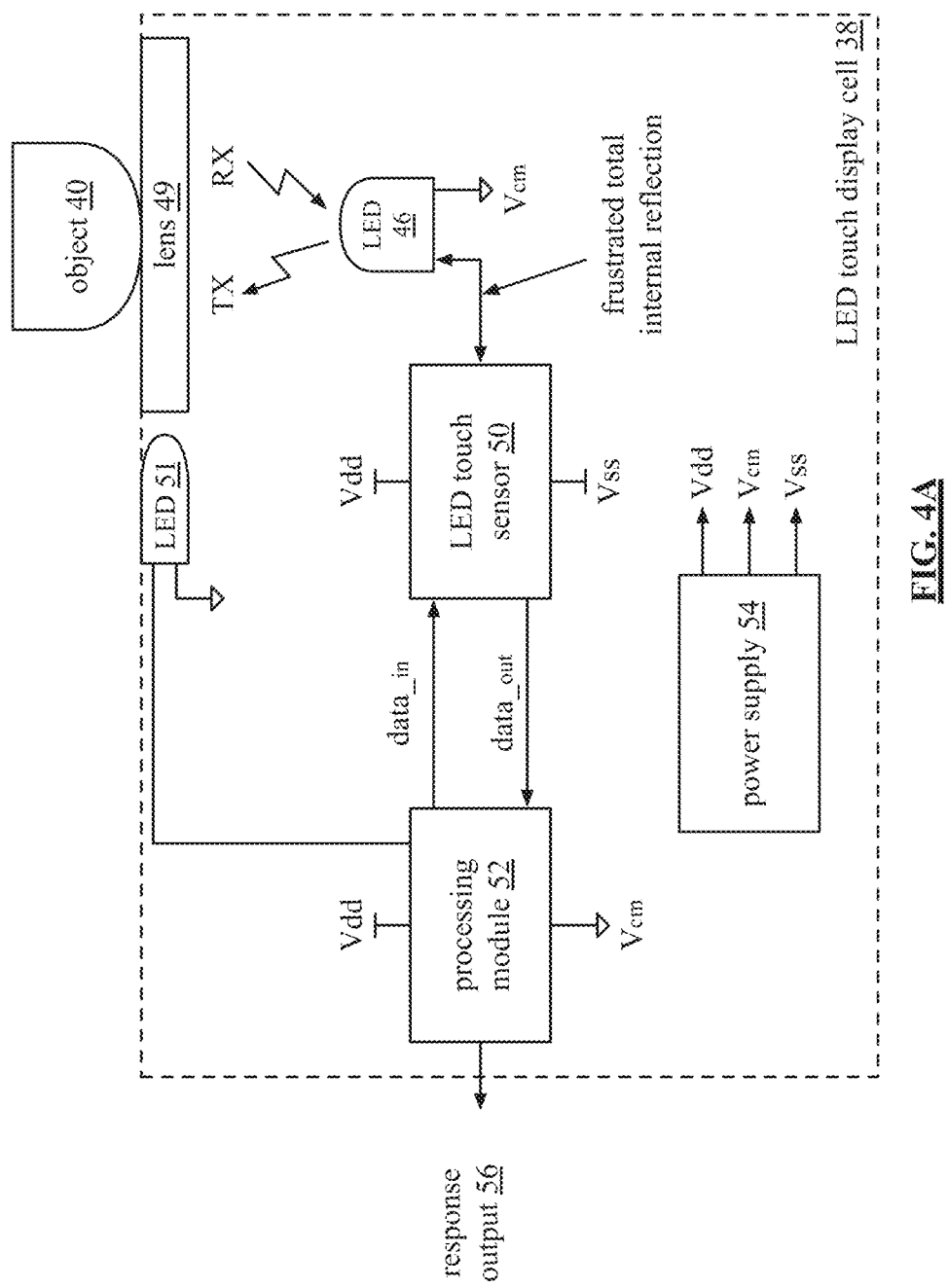
FIG. 4A is a schematic block diagram of another embodiment of a light emitting diode (LED) touch display cell in accordance with the present invention.

FIG. 4A is a schematic block diagram of another embodiment of a light emitting diode (LED) touch display cell 38 that includes the LED 46, another LED 51, the LED touch sensor 50, the processing module 52, the power supply 54, and a lens 49. In this embodiment, the processing module 52, or the LED touch sensor 50, provides a signal to the another LED 51 such that LED 51 provides light to the lens 49, which functions as a light waveguide for the light emitted by LED 51.

As an object 40 touches the lens 49, the touch causes some of the light emitted by LED 51 to be reflected towards the LED 46. This is referred to as "frustrated total internal reflection". During the receive mode, the LED 46 produces a current corresponding to the reflected light and the LED touch sensor 50 generates a digital representation of the current and outputs it as data_out. The processing module 52 processes the data_out to determine the touch and may further determine the pressure of the touch based on the amount of light being received.

FIGS. 5A-5B are schematic block diagrams of examples of generating a response output. As mentioned above, during the receive signal components, the LED touch sensor 50 receives a current from an LED 46. The LED touch sensor generates digital representations of the current from the LED and the processing module 52 determines digital representations of light intensity 62 based on the digital representations of the current.

Over time, an ambient light pattern 58 is produced based on the digital representations of light intensity 62. The ambient light pattern 58 includes a base ambient light 68 measurement with no blockages or changes. The digital input signal to the LED touch sensor can be adjusted based on the base ambient light 68 measurement (e.g., when there is less ambient light, the LED emits less intense light).

The processing module interprets the ambient light pattern 58 to determine an interaction (e.g., a touch, a touch pressure, a hover, a gesture, etc.). For example, changes to the base ambient light 68 with a particular rate of change 60 and/or that drop to a particular threshold represent certain interactions. The processing module processes the interaction to generate a response output.

In FIG. 5A, processing module establishes a base ambient light measurement 68 based on the digital representations of light intensity 62. The processing module interprets the ambient light pattern 58 to determine changes from this base ambient light measurement 68. For example, the digital representations of light intensity 62 reduce at a particular rate of change 60 to a point where there is little to no ambient light detected.

The processing module interprets this ambient light pattern 58 as a touch interaction (e.g., as an object gets close to the LED, less and less ambient light is sensed). The processing module processes the interaction to generate a response output 64. For example, the touch may correspond to a particular action (e.g., power on/off) and/or the length of the touch may correspond to a particular action (e.g., the length of touch corresponds to a delta change in volume, light intensity of the light emitted, window opening/closing, etc.).

In FIG. 5B, the processing module 52 establishes a base ambient light 68 based on the digital representations of light intensity 62. The processing module interprets the ambient light pattern 58 to determine changes from this base ambient light measurement 68. For example, the digital representations of light intensity 62 reduce at a particular rate of change 60 to a hover threshold level of light detected.

The processing module 52 interprets this ambient light pattern 58 as a hover interaction 66 (e.g., as an object hovers close to the LED, a certain level of ambient light is sensed). The processing module processes the interaction to generate a response output. For example, a hover interaction may be determined and then the processing module waits for further gesture information. A tap, swipe, length of hover, and/or other such gesture may be identified and processed to perform various actions (e.g., power on/off, volume change, lighting change, etc.). Additionally, the processing module 52 can be adapted to discriminate between gesture and/or touch information (interaction) and changes to ambient light and/or reflected light to LED 46 due to unrelated events, such as, for example, a display being placed in a user's pocket or against a user's face.

FIGS. 6A-6B are examples of determining an interaction based on ambient light level and distance of an object. FIG. 6A depicts a graph of ambient light 42 versus varying distance 44 between an object and the LED touch display cell. A maximum (max) ambient light level 70 is established as the base ambient light measurement discussed previously. The max ambient light level 70 occurs when objects are further away from the LED touch display cell (e.g., at a greater distance 44) such that ambient light is not obstructed.

A hover threshold 72 is defined as being between a level of ambient light associated with a distance d2 from the LED touch display cell and an ambient light level associated with a distance d1 from the LED touch display cell. The level of ambient light associated with a distance d2 is at a higher intensity than the ambient light level associated with a distance d1 and distance d2 is further from the LED touch cell surface than d1.

The processing module processes the digital representation of the light intensity to determine an ambient light pattern and is able to determine a hover indication when the ambient light pattern deviates from the maximum ambient light level 70 to the hover threshold 72. The processing module can then process the hover indication to generate the response output.

A touch threshold 74 is defined as being between a level of ambient light associated with a distance d1 and zero ambient light at a distance zero. The processing module processes the digital representation of the light intensity to determine an ambient light pattern and is able to determine a touch indication when the ambient light pattern deviates from the max ambient light 42 or the hover threshold 72 to the touch threshold 74. The processing module can then process the touch indication to generate the response output.

FIG. 6B is a graph of rate of distance change 60 of an object and a corresponding perceived pressure 76. Rate of distance change 60 is defined as the distance between two points (e.g., d2 and d1) divided by time. Depending on how fast an object moves from a first point (d2) to a second point (d1) within the hover threshold, the processing module determines an interaction. For example, when an object moves very quickly from d2 to d1, a higher pressure indicates an intended touch. When an object moves with slower speed from d2 to d1 a hover may be indicated as a lower pressure movement may not necessarily indicate a touch.

Figure 7:
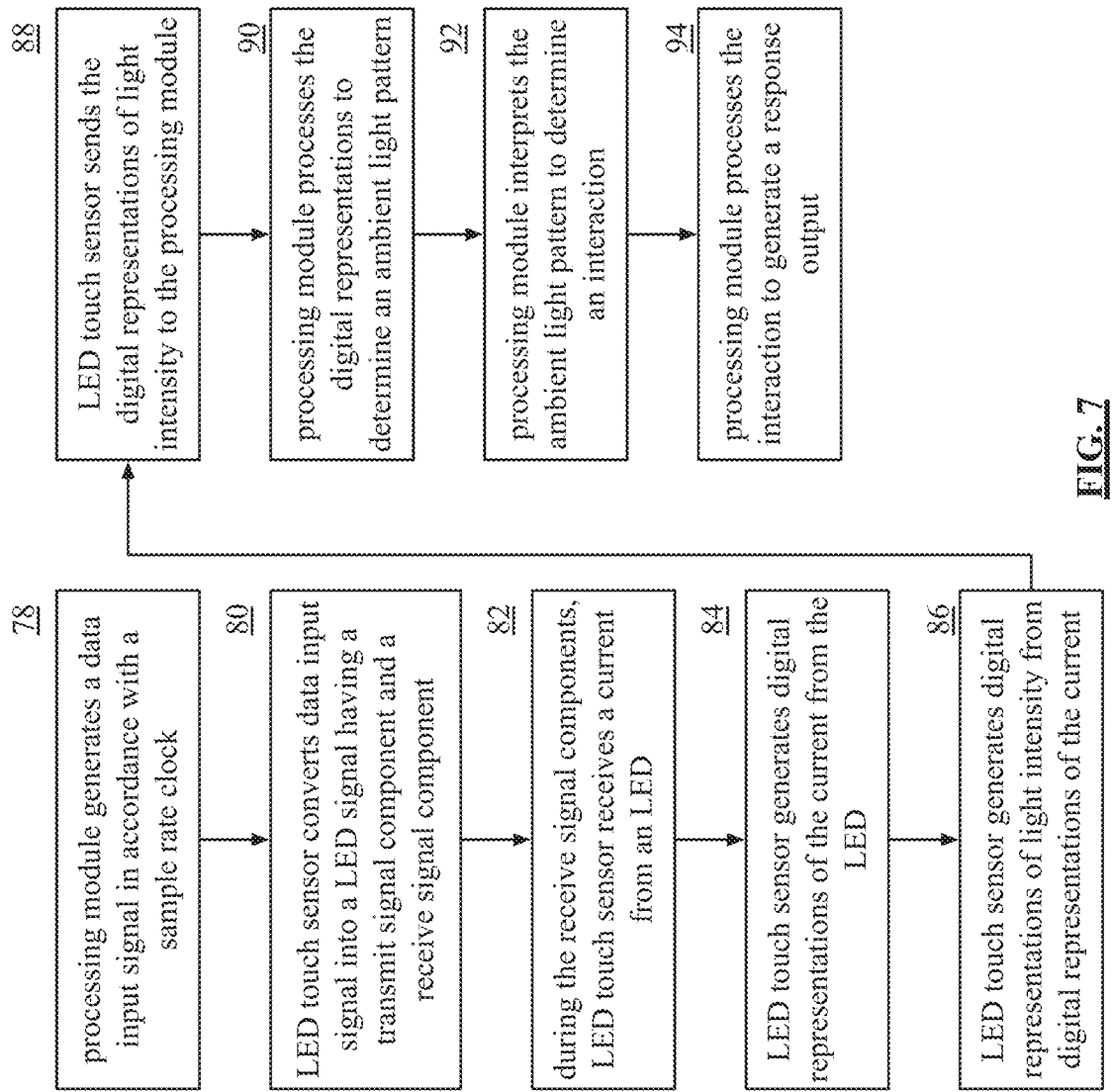
FIG. 7 is a logic diagram of an example of a method of ambient light based touch detection by a light emitting diode (LED) touch display cell in accordance with the present invention.

FIG. 7 is a logic diagram of an example of a method of ambient light based touch detection by a light emitting diode (LED) touch display cell. The method begins with step 78 where a processing module of the LED touch display cell generates a data input signal (e.g., data_in) in accordance with a sample clock rate. For example, the sample clock rate is 1/50 microseconds or 20 KHz which is a fast enough for the LED touch display cell to switch from transmit and receive without detection by the human eye.

The method continues with step 80 where an LED touch sensor of the LED touch display cell converts the data input signal into an LED signal (e.g., transmit-receive signal) where the LED signal includes a transmit signal component and a receive signal component. The method continues with step 82 where during the receive signal components, the LED touch sensor of the LED touch display cell receives a current from an LED of the LED touch display cell. The method continues with step 84 where the LED touch sensor generates digital representations of the current from the LED. The method continues with step 84 where the LED touch sensor generates digital representations of light intensity based on the digital representations of the current.

The method continues with step 88 where the LED touch sensor sends the digital representations of light intensity as a data output signal (e.g., data_out) to the processing module. The method continues with step 90 where the processing module processes the digital representations to determine an ambient light pattern. The ambient light pattern is determined by first establishing a base ambient light measurement with no blockages or changes. The input data signal to the LED touch sensor can be adjusted based on the base ambient light measurement (e.g., when there is less ambient light, the LED emits less intense light when in transmit mode).

The method continues with step 92 where the processing module interprets the ambient light pattern to determine an interaction (e.g., a touch, hover, hover and gesture, etc.). For example, a hover threshold is defined as being between a level of ambient light associated with a second distance from the LED touch display cell and an ambient light level associated with a first distance from the LED touch display cell. The level of ambient light associated with second distance is at a higher intensity than the ambient light level associated with the first distance and the second distance is further from the LED touch cell surface than the first distance.

The processing module processes the digital representation of the light intensity to determine an ambient light pattern and is able to determine a hover interaction when the ambient light pattern deviates from the base ambient light level to the hover threshold.

A touch threshold is defined as being between a level of ambient light associated with the first distance and zero ambient light at a distance zero. The processing module processes the digital representation of the light intensity to determine an ambient light pattern and is able to determine a touch indication when the ambient light pattern deviates from the base ambient light or the hover threshold to the touch threshold.

Further, rate of distance change and a corresponding perceived pressure can be used to determine an interaction. Rate of distance change is defined as the distance between two points (e.g., the second and first distance) divided by time. The faster an object moves from the second distance (d2) to the first distance (d1) (e.g., through the hover threshold region), the greater the perceived pressure. The processing module determines an interaction based on perceived pressure. For example, when an object moves very quickly from d2 to d1, a higher pressure indicates an intended touch. When an object moves with slower speed from d2 to d1 a hover may be indicated as a lower pressure movement may not necessarily indicate a touch.

The method continues with step 94 where the processing module processes the interaction to determine a response output. For example, a tap, swipe, length of touch/hover, and/or or other such gesture may be identified and processed to perform various actions (e.g., power on/off, volume change, lighting change, etc.). A hover interaction may be determined and then the processing module waits for further gesture information.

FIGS. 8A-8B are schematic block diagrams of a light emitting diode (LED) touch sensor 50 that includes data drive input circuit 96, drive-sense circuit 98, data output circuit 100, and LED 46. Data drive input circuit 96 is operable to generate a transmit-receive signal (e.g., analog input signal 102 or LED signal) based on a digital input (e.g., data_in). The transmit-receive signal includes a transmit signal component and a receive signal component. For example, the transmit-receive signal may be a sinusoidal or a square wave signal with a fixed period and a transmit duration based on light intensity. For example, the transmit signal component includes a pulse width modulation ($PWM_{in}$) signal component representative of a light intensity value. Data drive input circuit 96 is discussed in greater detail with reference to FIGS. 11A-16.

FIG. 8A depicts LED touch sensor 50 in a transmit mode and FIG. 8B depicts LED touch sensor 50 in a receive mode. In FIG. 8A, when the transmit signal component is active, drive-sense circuit 98 forward biases the LED in accordance with a light intensity value (e.g., $PMW_{in}$) of the transmit signal component of analog input signal 102 such that the LED emits light in accordance with a transmit current $i_{tx}$. Drive-sense circuit 98 also outputs digital signal 104 to data output circuit 100 for output processing. Drive-sense circuit 98 is discussed in greater detail with reference to FIGS. 9A-10C. When in transmit mode, digital signal 104 represents loop error corrections due to changes in the transmit current $i_{tx}$. Data output circuit 100 outputs the error correction signal as data_out.

In FIG. 8B, when the receive signal component is active, drive-sense circuit 98 reverse biases LED 46 such that the LED generates a current based on received light. Drive-sense circuit 98 generates a digital representation of the current (e.g., digital signal 104). Data output circuit 100 produces a digital representation of light intensity based on digital signal 104 as output signal data_out.

FIGS. 9A-9D are schematic block diagrams of embodiments of drive-sense circuit 98. Drive-sense circuit 98 includes resistive network 110, bi-directional dependent current source 106, operational amplifier (op-amp) 112, and analog to digital converter 108. Resistive network 110 include a first resistive divider (e.g., R1 and R2) and a second resistive divider (e.g., R3 and R4). Each resistive divider operates as a current-to-voltage conversion circuit. Resistive network 110 receives analog input signal 102 from data drive input circuit 96 and generates input voltages for op-amp 112. For example, the first resistive divider generates a reference signal voltage (e.g., v_in2) from analog input signal 102 and the second resistive divider generates a data signal voltage (e.g., v_in1) from analog input signal 102.

Analog input signal 102 has a receive signal component and a transmit signal component. For example, analog signal 102 is a sinusoidal wave where a positive amplitude corresponds to a transmit data component and a negative amplitude corresponds to a receive data component. The length of the transmit component determines the light intensity value. As another example, analog signal 102 is a square wave.

Op-amp 112 is a difference detection circuit that outputs an appropriate output voltage (error correction (EC) signal 114) such that bi-directional dependent current source 106 can generate the error correction current (iEC) needed to keep op-amp 112 inputs v_in1 and v_in2 equal. Alternatively, other types of difference detection circuits may be used such as a comparator circuit.

Bi-directional dependent current source 106 is operable to generate an error correction current (iEC) based on the error correction signal 114 in order to cause the data signal voltage (e.g., v_in1) to substantially match reference signal voltage (e.g., v_in2).

Analog to digital converter 108 may be implemented as a flash analog to digital converter (ADC), a successive approximation ADC, a ramp-compare ADC, a Wilkinson ADC, an integrating ADC, a delta encoded ADC, and/or a sigma-delta ADC. Analog to digital converter 108 converts the analog error correction signal output from op-amp 112 to digital signal 104. The analog to digital converter 108 sends the digital signal 104 to data output circuit 100 for further output processing.

When the transmit signal component is active, the drive-sense circuit 98 operates to forward bias the LED in accordance with a light intensity value. When the receive signal component is active, the drive-sense circuit 98 operates to reverse bias the LED such that the LED generates a current based on received light and generates a digital representation of the current.

Figure 9A:
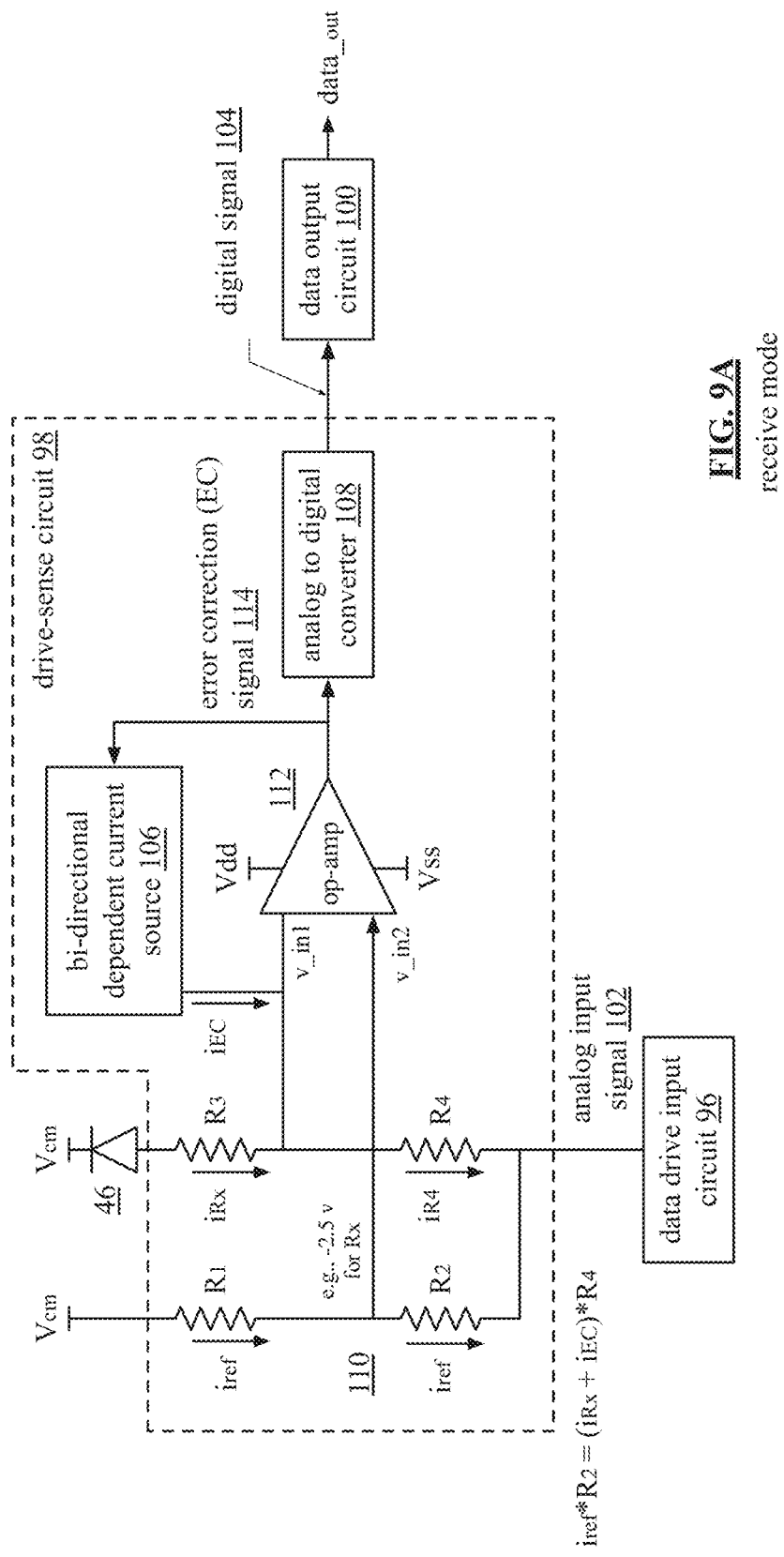
FIGS. 9A-9D are schematic block diagrams of embodiments of a drive-sense circuit in accordance with the present invention.

FIG. 9A depicts drive-sense circuit 98 in a receive mode (e.g., the receive component of analog input signal 102 is active). In receive mode, common mode voltage (Vcm) is equal to 0 volts and the receive component of the analog input signal has an amplitude of Vss. For example, Vss is equal to −5 volts. The first resistive divider (e.g., R1 and R2) of resistive network 110 generates a reference signal voltage (e.g., v_in2) based on the receive component of analog input signal 102. For example, the reference signal voltage is −2.5 volts when Vss is −5 and R1=R2.

The second resistive divider (e.g., R3 and R4) of resistive network 110 generates a data signal (e.g., v_in1) to reverse bias the LED. In receive mode, the LED generates a current (iRx) based on received light. Therefore, the data signal is based on the current produced by the LED (iRx), the receive component, and the error correction current (iEC) generated by the bi-directional dependent current source 106.

Op-amp 112 is powered by a positive voltage source (Vdd) and a negative voltage source (Vss). The output voltage of the op-amp 112 is error correction signal 114 which represents the voltage needed for bi-directional dependent current source 106 to generate the correct error correction current iEC to keep v_in1 and v_in2 equal. V_in1 is equal to (iRx+iEC)×R3 and v_in2 is equal to iref×R2. Therefore, in order for v_in1 and v_in2 to be equal, iRx+iEC needs to equal iref. As iRx increases due to light detection, iEC is decreased based on error correction signal 114. The error correction signal 114 is representative of the current change due to light detection. Op-amp 112 outputs error correction signal 114 to the bi-directional dependent current source 106 and analog to digital converter 108.

Bi-directional dependent current source 106 generates the value of iEC required to keep v_in1 and v_in2 equal. Bi-directional dependent current source 106 will be discussed in greater detail with reference to FIGS. 10A-10C. Analog to digital converter 108 converts the error correction signal 114 to digital signal 104 representative of the current of the received light. Analog to digital converter 108 sends digital signal 104 to data output circuit 100 for further output processing (e.g., data output circuit 100 produces a digital representation of light intensity based on the digital representation of the current) to produce a data output signal (data_out).

Figure 9B:
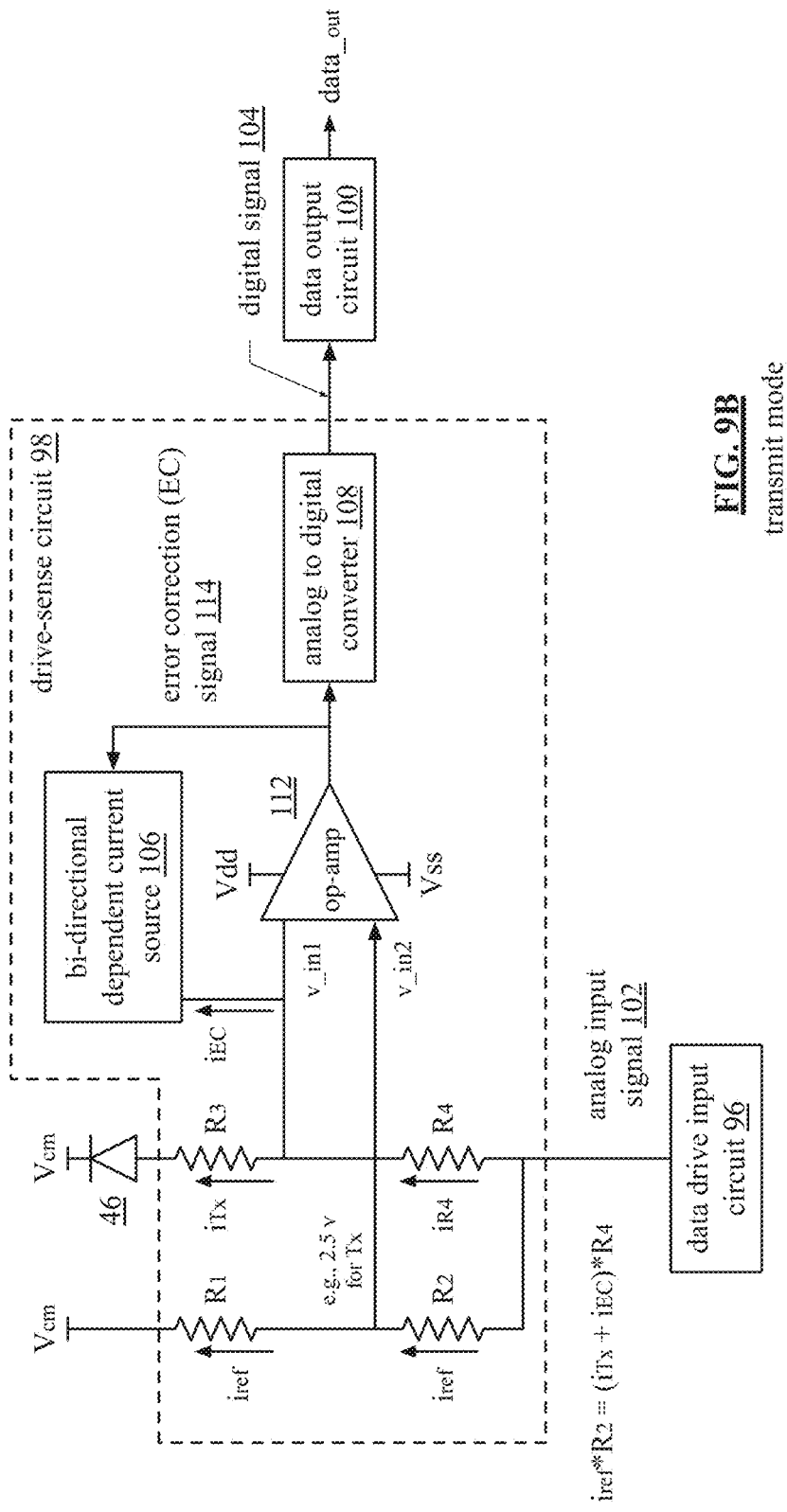

FIG. 9B depicts drive-sense circuit 98 in a transmit mode (e.g., the transmit component of analog input signal 102 is active). In transmit mode, common mode voltage (Vcm) is equal to 0 volts and the transmit component of the analog input signal has an amplitude of Vdd. For example, Vdd is equal to 5 volts. The first resistive divider (e.g., R1 and R2) of resistive network 110 generates a reference signal voltage (e.g., v_in2) based on the transmit component of analog input signal 102. For example, the reference signal voltage is 2.5 volts when Vdd is 5 volts and R1=R2. Alternatively, a fraction of Vdd can be used for transmit mode so that current during receive mode is greater as compared to transmit mode. An accurate digital signal 104 measurement is more important during receive mode (e.g., the measurement of received light) therefore the circuit can be biased to get a more accurate measurement during the receive mode.

The second resistive divider (e.g., R3 and R4) of resistive network 110 generates a data signal (e.g., v_in2) to forward bias the LED. In transmit mode, the LED current (iTx) or drive current is fixed based on the type of LED used. Op-amp 112 is powered by a positive voltage source (Vdd) and a negative voltage source (Vss). The output voltage of the op-amp 112 is error correction signal 114 and represents the voltage needed for bi-directional dependent current source 106 to generate the error correction current iEC in order to keep v_in1 and v_in2 equal. V_in1 is equal to (iTx+iEC)×R3 and v_in2 is equal to iref×R2. Therefore, in order for v_in1 and v_in2 to be equal, iTx+iEC needs to equal iref.

Op-amp 112 outputs error correction signal 114 to the bi-directional dependent current source 106 and analog to digital converter 108. Bi-directional dependent current source 106 generates error correction current (iEC) to ensure the inputs to op-amp 112 are equal. Analog to digital converter 108 converts the analog error correction signal 114 output from op-amp 112 to digital signal 104. Analog to digital converter 108 sends digital signal 104 to data output circuit 100 for further output processing to produce a data output signal (data_out).

The digital signal 104 contains information regarding light being reflected back onto the LED 46. For example, when no object is near the LED 46 in transmit mode, no light from the LED is reflected back on it. As another example, as an object gets closer and closer to the LED 46, more and more light is reflected back on the LED. The reflected light affects the voltage-current curve of the LED in the forward bias direction. The change in the voltage-current curve is represented in the digital signal 104 and can be interpreted to augment a touch, hover, and/or gesture movement.

Figure 9C:
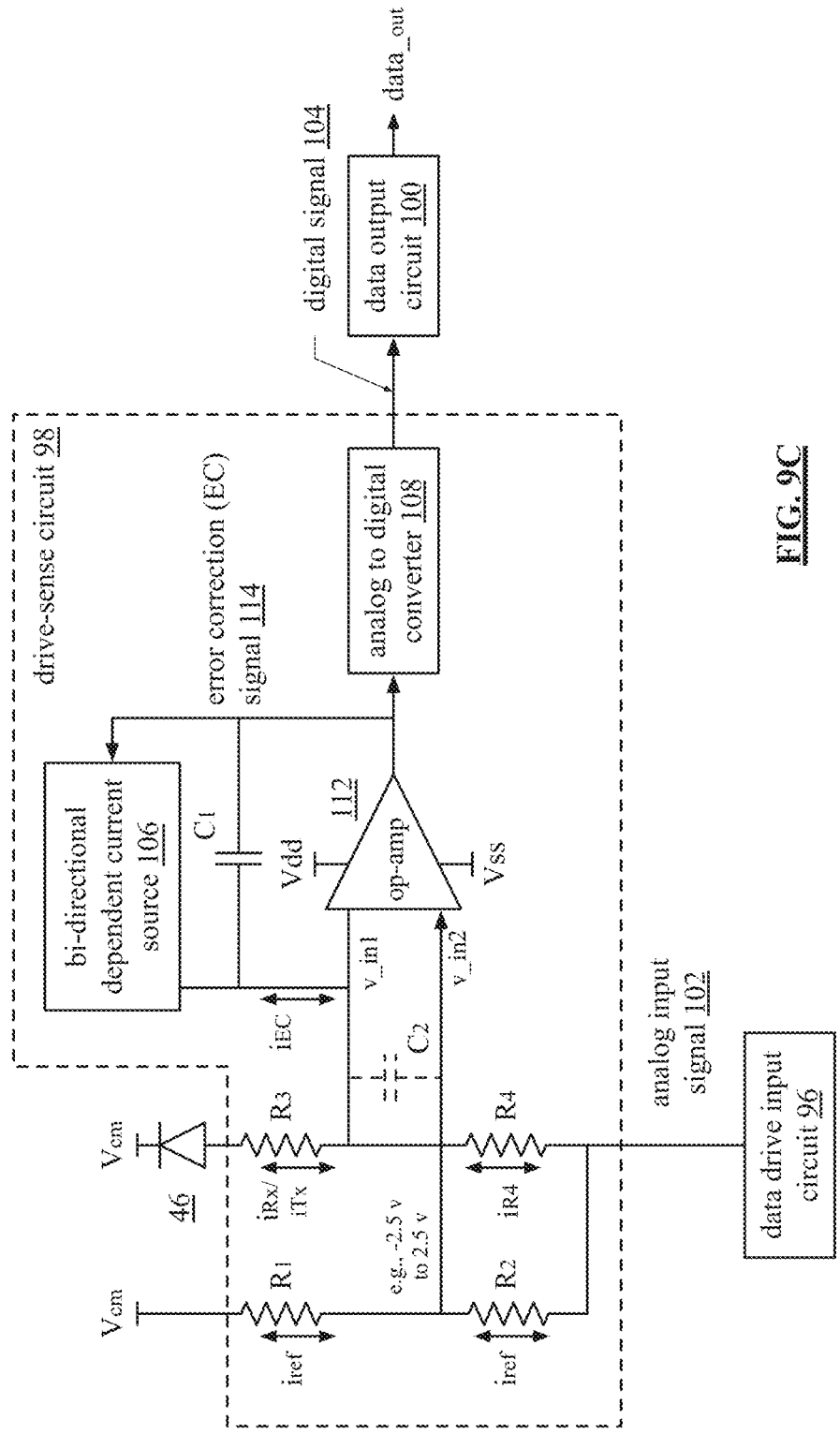

FIG. 9C operates similarly to FIGS. 9A and 9B, except drive-sense circuit 98 includes a capacitance feedback circuit having one or more capacitors and/or resistors. The circuit may further include a second capacitor coupled across the input of op-amp 112. In this example, the capacitance feedback circuit includes capacitor (C1) coupled to the positive input of op-amp 112 and to the output of op-amp 112. Optional input capacitor (C2) is coupled to both inputs of op-amp 112 for potential further transient response.

The capacitance feedback circuit dampens transitions that occur when the drive sense circuit switches between transmit and receive mode. The output voltage (e.g., the error correction signal) is stored in the charge of the feedback capacitor C1 to account for fast input transitions and propagation delay of op-amp 112. Optional input capacitor C2 improves high-frequency response (e.g., high frequency noise with high impedance can be attenuated with a low-valued capacitor) but may introduce instability. However, the capacitance feedback circuit (C1) can compensate for input capacitance instability.

Figure 9D:
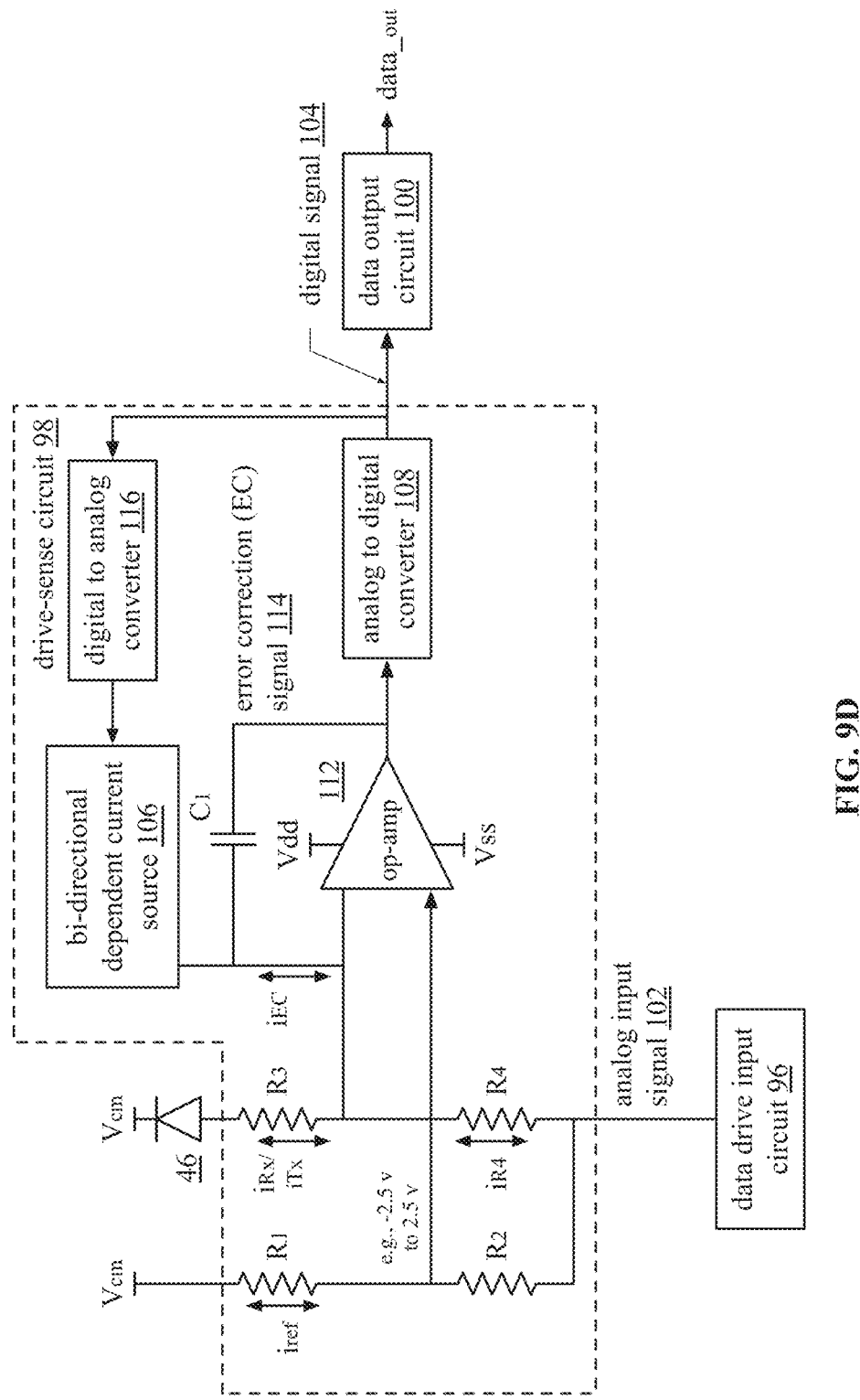

FIG. 9D operates similarly to FIG. 9C except drive-sense circuit 98 further includes digital to analog converter (DAC) 116 connected to the output of analog to digital converter 108 and the input of bi-directional dependent current source 106. The DAC 116 is one of a sigma-delta DAC, a pulse width modulator DAC, a binary weighted DAC, a successive approximation DAC, and/or a thermometer-coded DAC.

Op-amp 112 outputs error correction signal 114 to analog to digital converter 108. Analog to digital converter 108 converts error correction signal 114 to a digital signal 104 where it is output to data output circuit 100 for further processing. Analog to digital converter 108 also sends digital signal 104 to digital to analog converter 116 where digital to analog converter 116 converts digital signal 104 back to an analog signal for input into bi-directional dependent current source 106. With, Iref*R2=IR4*R4, the resistance R2 may be selected to be much larger than R4 such that most current is through the LED and not the first resistive divider of resistive network 110. Note that the DAC 166 may be included on any one of the embodiments of the drive sense circuit discussed herein.

Figure 10A:
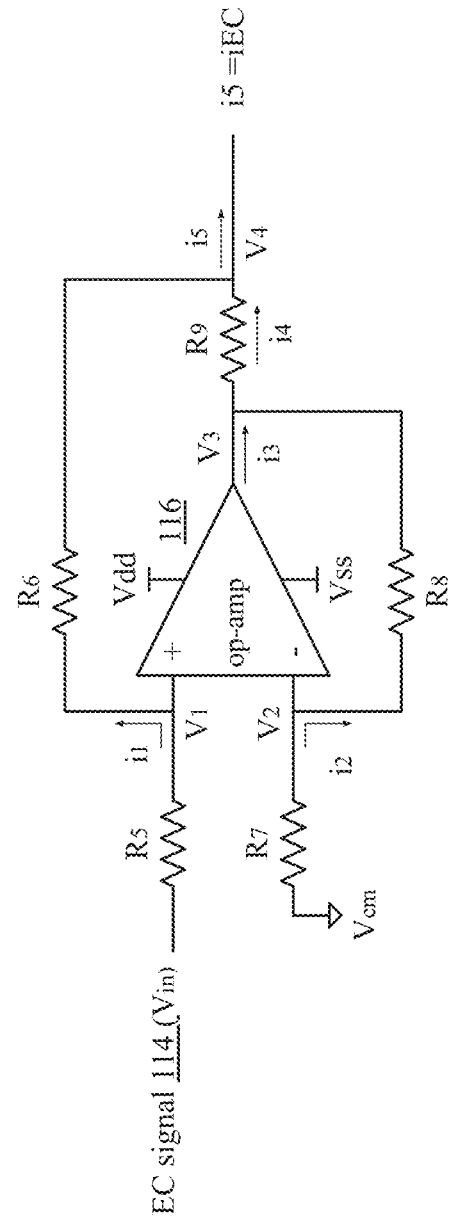
FIGS. 10A-10C are schematic block diagrams of a bi-directional dependent current source in accordance with the present invention.
Figure 10B:
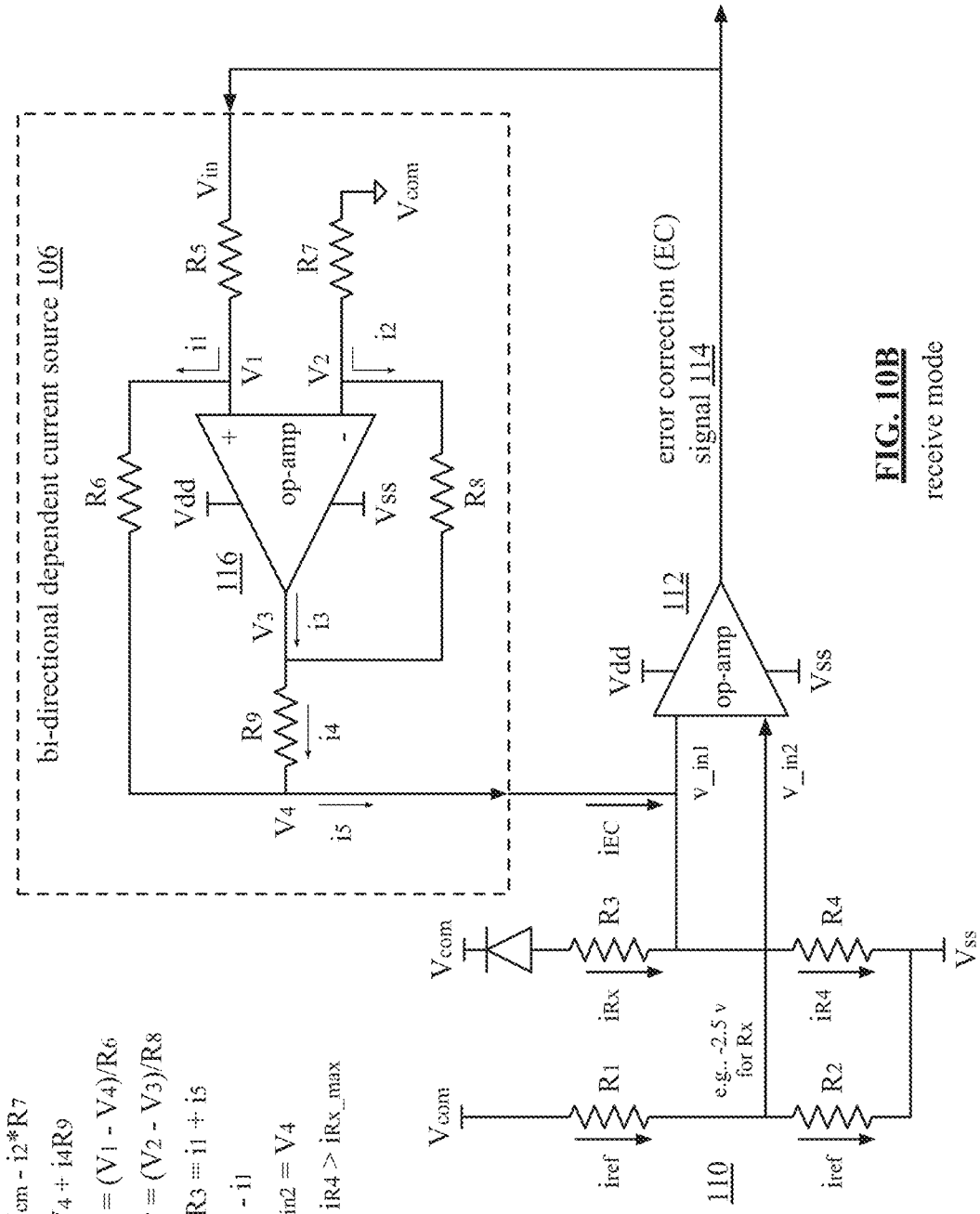
Figure 10C:
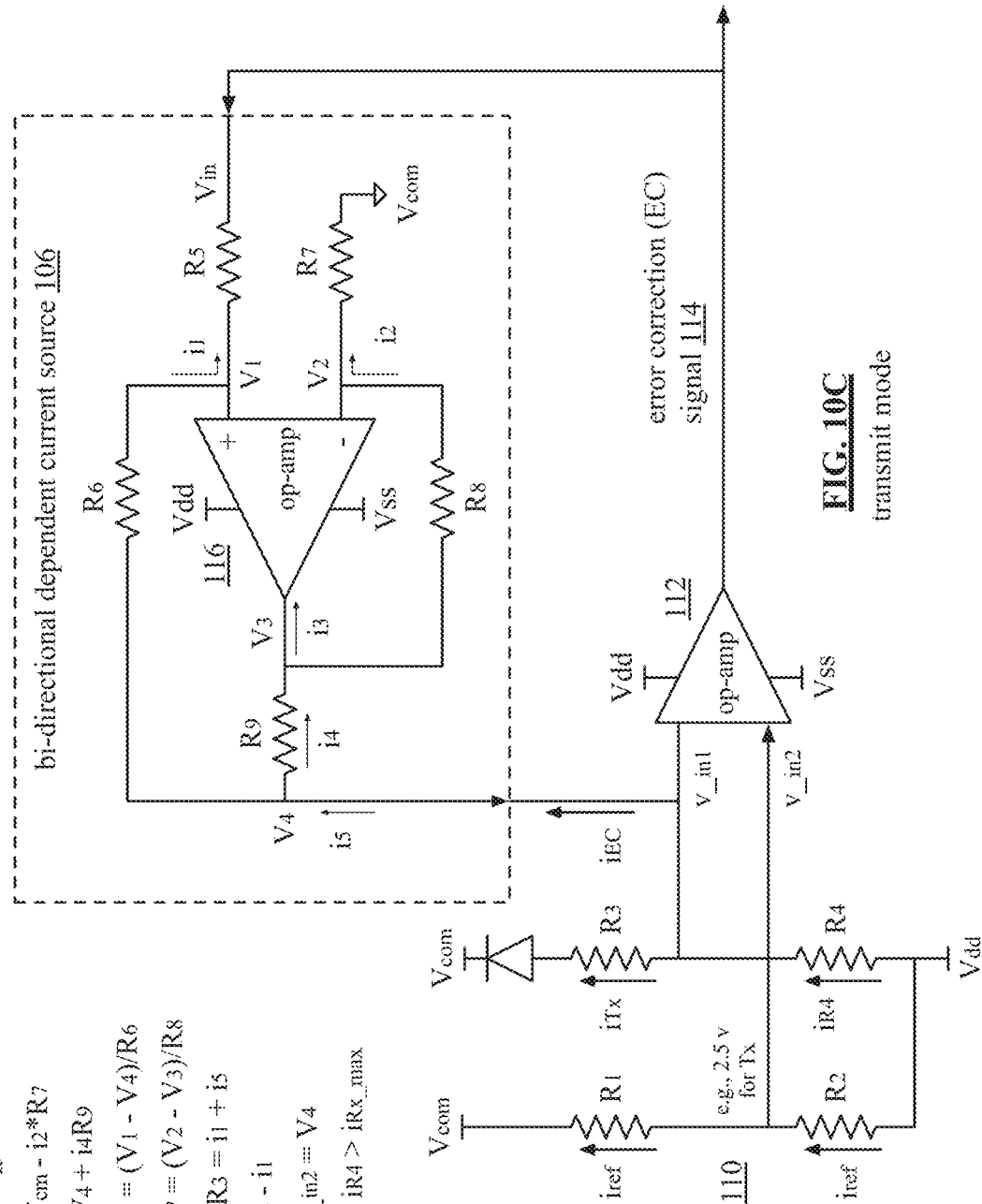

FIGS. 10A-10C are schematic block diagrams of bi-directional dependent current source 106. Bi-directional dependent current source 106 takes error correction (EC) signal 114 (Vin) and generates an error correction current (iEC) to compensate for current changes created by light emitting diode (LED) (e.g., current generated due to light detection in a receive mode and fixed current used to drive the LED in a transmit mode).

As shown in FIG. 10A, bi-directional dependent current source 106 includes operational amplifier (op-amp) 116 that is powered by a positive voltage source (Vdd) and a negative voltage source (Vss). A first impedance (e.g., resistor R5) is coupled to a positive input of op-amp 116 and receives the error correction (EC) signal 114 or Vin.

A second impedance (e.g., resistor R7) is coupled to a reference voltage (Vcm=0) and to a negative input of op-amp 116. A third impedance (e.g., resistor R6) coupled to the positive input of op-amp 116 and to an output of bi-directional dependent controlled current source 106. A fourth impedance (e.g., resistor R8) is coupled from the negative input to the output of op-amp 116. A fifth impedance e.g., resistor R9) coupled from the output of op-amp 116 and to the output of bi-directional dependent current source 106. Impedance values and op-amp 116 operational characteristics are chosen such that the appropriate value of iEC is generated.

FIG. 10B depicts bi-directional dependent current source 106 in a receive mode (e.g., the receive component of analog input signal 102 is active). In receive mode, common mode voltage (Vcm) is equal to 0 volts and the receive component of the analog input signal has an amplitude of Vss. For example, Vss is equal to −5 volts. The first resistive divider (e.g., R1 and R2) of resistive network 110 of the drive-sense circuit generates a reference signal voltage (e.g., v_in2) based on the receive component of analog input signal 102. For example, the reference signal voltage is −2.5 volts when Vss is −5 and R1=R2.

The second resistive divider (e.g., R3 and R4) of resistive network 110 generates a data signal (e.g., v_in1) to reverse bias the LED. In receive mode, the LED generates a current (iRx) based on received light. As a specific example, the light received by the LED generates a current of 1 mA. Therefore, iRx=1 mA. In order for v_in1 to equal v_in2 (e.g., −2.5 volts), bi-directional dependent current source 106 generates iEC such that iEC+iRx is equal to iR4. In this example, iR4 is equal to 25 mA (e.g., −2.5-4-5)=2.5 V/100 ohms=25 mA, where R4=100 ohms).

Error correction (EC) signal 114 is the voltage required for bi-directional dependent current source 106 to generates error correction current iEC such the irX+iEC=iR4. For example, bi-directional dependent current source 106 generates iEC to equal 24 mA (e.g., 1 mA+24 mA=25 mA).

FIG. 10C depicts bi-directional dependent current source 106 in a transmit mode (e.g., the transmit component of analog input signal 102 is active). In transmit mode, common mode voltage (Vcm) is equal to 0 volts and the transmit component of the analog input signal has an amplitude of Vdd. For example, Vdd is equal to 5 volts. The first resistive divider (e.g., R1 and R2) of resistive network 110 generates a reference signal voltage (e.g., v_in2) based on the transmit component of analog input signal 102. For example, the reference signal voltage is 2.5 volts when Vdd is 5 volts and R1=R2.

The second resistive divider (e.g., R3 and R4) of resistive network 110 generates a data signal (e.g., v_in1) to forward bias the LED. Error correction (EC) signal 114 is the voltage required for bi-directional dependent current source 106 to generate the appropriate error correction current iEC. In transmit mode, the LED current (iTx) is fixed based on the type of LED used. In order for v_in1 to equal v_in2 (e.g., 2.5 volts), bi-directional dependent current source 106 generates iEC such that iEC+iTx is equal to iR4. For example, if iTx is equal to −20 mA to drive the LED and iR4 is equal to −25 mA (e.g., 2.5-5V=−2.5V/100 ohms=−25 mA, where R4=100 ohms), then bi-directional dependent current source 106 generates iEC to equal −5 mA (e.g., −5 mA-20 mA=−25 mA).

Figure 11A:
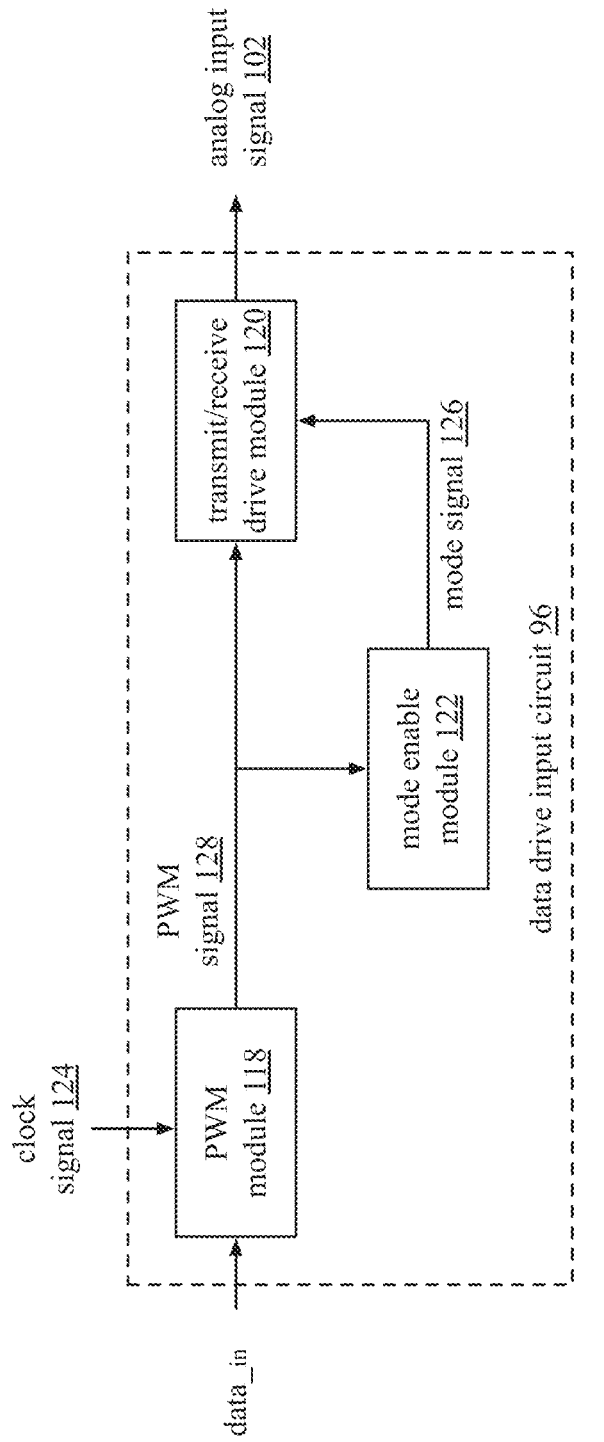
Figure 11C:
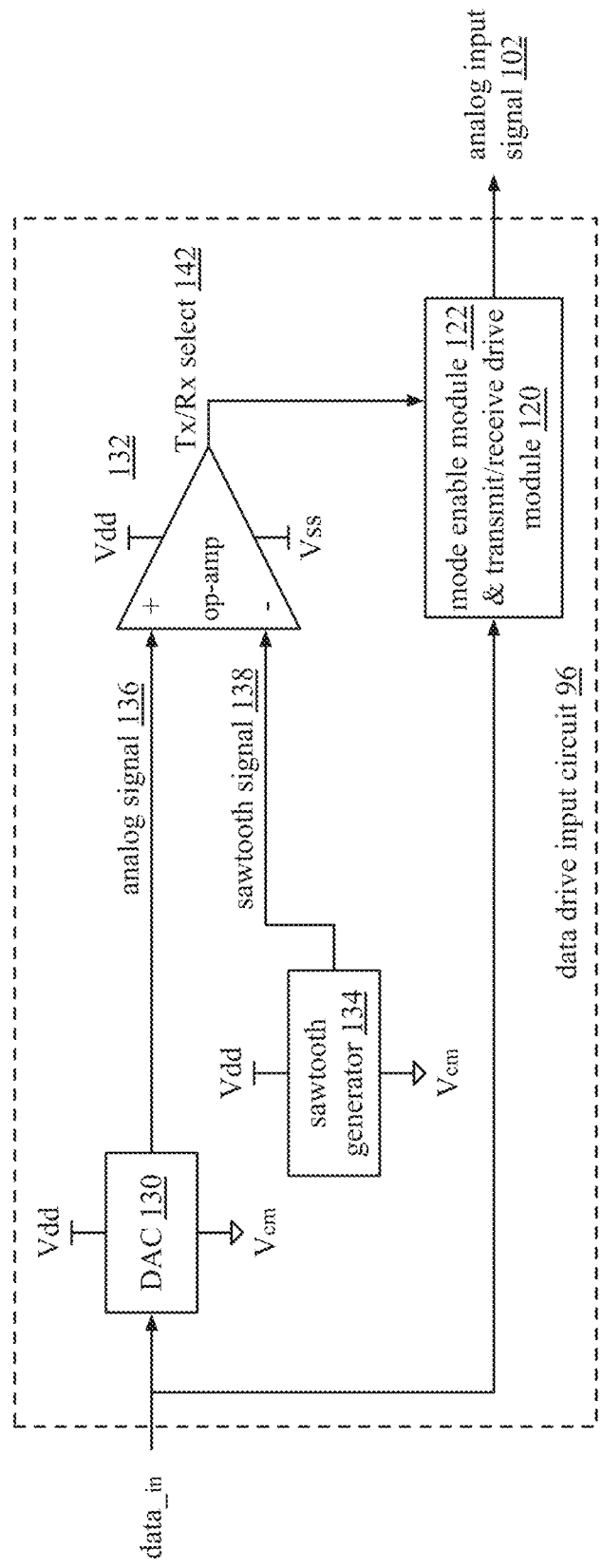

FIGS. 11A-11C are schematic block diagrams of embodiments of data drive input circuit 96 that includes pulse width modulation (PWM) module 118, transmit/receive drive module 120, and mode enable module 122. Data drive input circuit 96 takes an input signal (e.g., data_in) which is conventionally used for display and converts it to analog input signal 102. Analog input signal 102 has two purposes: mode select and data conveyance.

As shown in FIG. 11A, data_in is received by PWM module 118. PWM module 118 generates PWM signal 128 based on data_in and in accordance with clock signal 124. PWM signal 128 represents both the data and mode select. For example, the brighter the display data (e.g., data_in), the longer the LED is in transmit mode. The pulse width of the PWM signal indicates the length of the transmit mode and thus a light intensity value. Further, with the PWM signal 128 high, the LED is in transmit mode and when the PWM signal 128 is low, the LED is in receive mode.

Mode enable module 122 receives PWM signal 128 and establishes an LED transmit mode of mode signal 126 when the PWM signal 128 is in a first state (e.g., high) and establishes an LED receive mode of the mode signal 126 when the PWM signal 128 is in a second state (e.g., low).

PWM signal 128 and mode signal 126 are received by the transmit/receive drive module 120. When the mode signal 126 received indicates the transmit mode, transmit/receive drive module 120 generates a transmit data signal component of analog input signal 102 based on the PWM signal 128. When the mode signal 126 received indicates the receive mode, transmit/receive drive module 120 generates a receive signal component of the analog input signal 102 based on the PWM signal 128.

Transmit/receive drive module 120 outputs the analog input signal 102. The transmit data signal component of analog input signal 102 is operable to drive the LED when the LED transmit mode is active causing the LED to emit light. The receive signal component of analog input signal 102 is affected by light received by the LED and the effect on the receive signal component is representative of light being received by the LED.

FIG. 11B depicts data drive input circuit 96 that includes PWM module 118 and mode enable module 122 and transmit/receive drive module 120 integrated as one module. PWM module 118 includes a digital to analog converter (DAC) 130, operational amplifier (op-amp) 132, and sawtooth generator 134. Mode enable module 122 and transmit/receive drive module 120 includes multiplexor 141 and signal drive circuit 140. FIG. 11B further includes a timing diagram of data drive input circuit 96's signals.

The DAC 130 of PWM module 118 is one of a sigma-delta DAC, a pulse width modulator DAC, a binary weighted DAC, a successive approximation DAC, and/or a thermometer-coded DAC. DAC 130 receives digital input signal data_in and converts it to analog signal 136. Digital input signal data_in is set based on a clock signal to ensure enough time for transmit and receive components. Max transmit (TX) time shown in the timing diagram represents the longest transmit time possible according to the data_in signal and thus the greatest light intensity transmitted. Shortening the transmit time lowers the light intensity.

Analog signal 136 varies based on data_in and is input to the positive input of op-amp 132. Sawtooth generator 134 generates a sawtooth signal 138 in accordance with the clock signal 124 and is input to the negative input of op-amp 132.

Op-amp 132 generates PWM signal 128 by comparing analog signal 136 and the sawtooth signal 138. The amplitude of the PWM signal 128 determines the transmit or receive mode and the pulse width determines the max transmit time. PWM signal 128 is input to the multiplexor of the mode enable module 122 and transmit/receive drive module 120. Based on the PWM signal 128, the multiplexor outputs either a transmit voltage (Vtx) or a receive voltage (Vrx). Vtx is equal to Vdd or less and Vrx is equal to Vss or more. Using less than Vdd for Vtx allows for more voltage to be used in the receive mode. Allowing for more voltage in the receive mode improves light sensing capabilities.

The multiplexor 141 outputs either Vtx or Vrx to signal drive circuit 140. Signal drive circuit 140 could be a bi-directional current or voltage source and produces the analog output signal 102 based on the input from the multiplexor 141. For example, when the multiplexor selects Vtx, the analog input signal 102 includes a transmit component with a transmit time depending on the light intensity that does not exceed the max transmit time. When the multiplexor selects Vrx the analog input signal 102 includes the receive component.

FIG. 11C operates similarly to FIG. 11B except data drive input circuit 96 of FIG. 11C does not include PWM module 118. Instead, input signal data_in is input to both digital to analog converter (DAC) 130 and mode enable module 122 and transmit/receive drive module 120. Op-amp 132 generates a transmit/receive (Tx/Rx) select signal 142 by comparing analog signal 136 and the sawtooth signal 138. Mode enable module 122 and transmit/receive drive module 120 processes data_in and uses Tx/Rx select signal 142 to produce analog input signal 102 having transmit and receive components.

Figure 12:
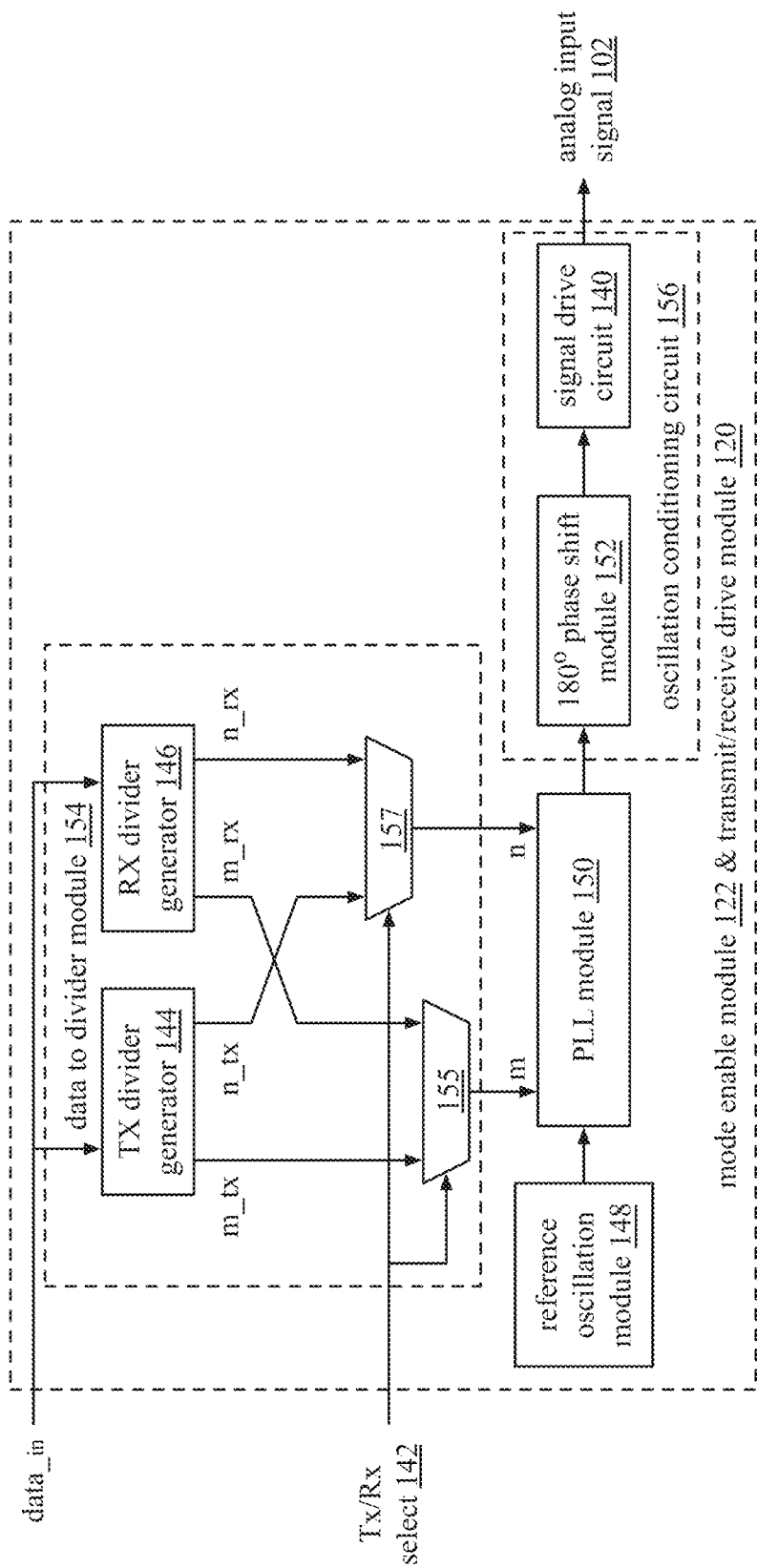
FIG. 12 is a schematic block diagram of an embodiment of a mode enable module and transmit/receive drive module in accordance with the present invention.

FIG. 12 is a schematic block diagram of an embodiment of mode enable module 122 and transmit/receive drive module 120 that includes a data to divider module 154, reference oscillation module 148, phase locked loop (PLL) module 150, and oscillation conditioning circuit 156.

Data to divider module 154 includes transmit (TX) divider generator 144, receive (RX) divider generator 146, and a multiplexor module having one or more multiplexors (e.g., shown here as two multiplexors 155 and 157). PLL module 150 includes one or more PLLs each having a range of frequencies selected based on input data. PLL module 150 is a closed loop system that locks the phase of its output to an input reference signal. Oscillation conditioning circuit 156 includes a 180° phase shift module 152 and signal drive circuit 140.

Reference oscillation module 148 generates a reference oscillation signal for input into PLL module 150 and may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal.

In an example of operation, data_in is input to TX divider generator 144 and RX divider generator 146 of data to divider module 154. TX divider generator 144 generates a transmit divider value set (e.g., m_tx and n_tx) based on data_in. RX divider generator 146 generates a receive divider value set (e.g., m_tx and n_tx) based on data_in. A first transmit value (e.g., m_tx) of the transmit divider value set is input to multiplexor 155 of the multiplexor module and a second transmit value (e.g., n_tx) of the transmit divider value set is input to multiplexor 157 of the multiplexor module.

A first receive value (e.g., m_rx) of the receive divider value set is input to multiplexor 155 and a second receive value (e.g., n_rx) of the receive divider value set is input to multiplexor 157 of the multiplexor module. Multiplexors 155 and 157 are operable to output on transmit divider value set or the receive divider value set based on the Tx/Rx select signal 142 received to produce the divider value set (e.g., m and n).

The divider value set is input into PLL module 150 along with a reference oscillation signal from reference oscillation module 148. PLL module 150 is operable to generate a fixed period, varying half cycle oscillation based on the reference oscillation and the divider value set. PLL module 150 has a bandwidth that is greater than the data clock rate so the rate of the PLL module 150 can change in the desired time frame for the transmit and receive periods.

PLL module 150 inputs the fixed period, varying half cycle oscillation to oscillation conditioning circuit 156. Oscillation conditioning circuit 156 is operable to generate the analog input signal 102 based on the fixed period, varying half cycle oscillation. In particular, 180° phase shift module 152 inverts the fixed period varying half cycle oscillation to produce an inverted oscillation cycle. Signal drive circuit 140 produces the analog input signal 102 based on the inverted oscillation cycle. Note that, in an embodiment, the PLL module 150 has a loop response that is at a frequency that is greater than the frequency (i.e. 1 over the data rate) of the input data.

Figure 13:
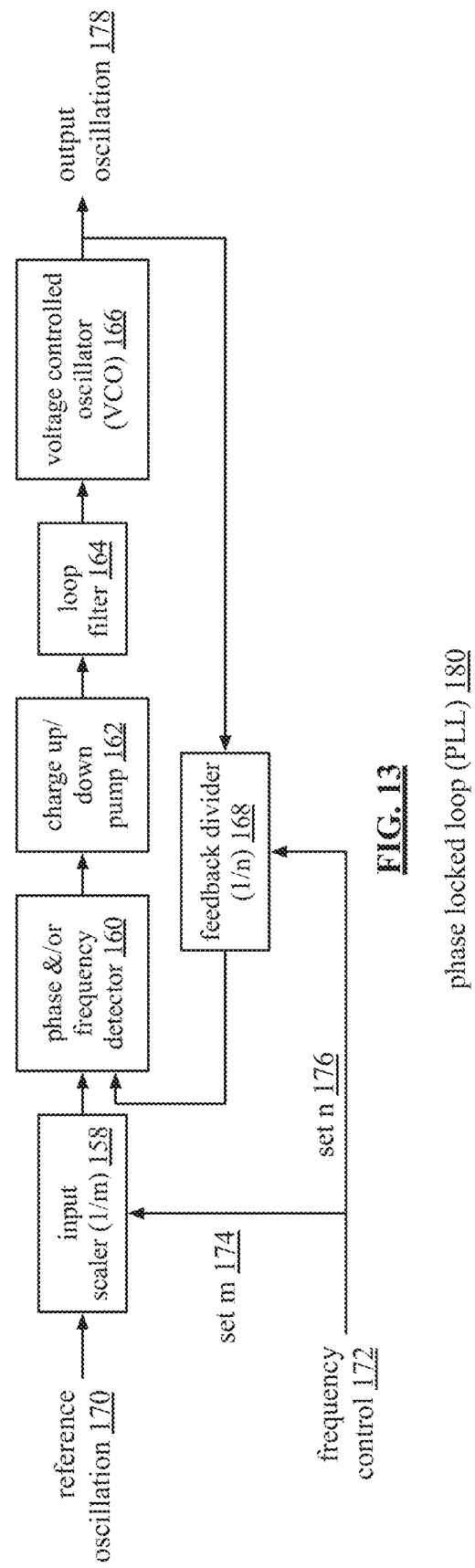
FIG. 13 is a schematic block diagram of an embodiment of a phase locked loop (PLL)

FIG. 13 is a schematic block diagram of an embodiment of a phase locked loop (PLL) 180 that may be one or more PLLs of PLL module 150. PLL includes input scalar (1/m) 158, phase &/or frequency detector 160, charge up/down pump 162, loop filter 164, voltage controlled oscillator (VCO) 166, and feedback divider (1/n) 168. PLL module 150 is a closed loop system that locks the phase of its output (e.g., output oscillation 178) to an input reference signal (e.g., reference oscillation 170).

Input scalar (1/m) 158 multiplies reference oscillation 170 by 1/m (e.g., where m is input from the divider value set). Phase &/or frequency detector 160 compares the scalar divided oscillation 170 signal with the frequency and phase of the feedback signal to produce a digital pulse error signal that is proportional to the phase difference between the input and reference. Charge up/down pump 162 acts as a bipolar switched current source and converts the digital pulse error signal of the phase &/or frequency detector 160 into analog error current signals suitable to control VCO 166.

Loop filter 164 integrates the charge up/down pump 162 output current to an equivalent VCO control voltage. VCO 166 is a low-swing oscillator that produces an output oscillation 178 frequency corresponding to the VCO control voltage. Feedback divider 168 divides output oscillation 178 frequency by n (e.g., where n is input from the divider value set) and is fed for comparison to the reference oscillation 170. Frequency controller 172 sets a value for m 174 into input scalar (1/m) and a value for n 176 into feedback divider (1/n) 168. As such, the output oscillation frequency (PLL out) is equal to the reference oscillation frequency (f_ref)×(n/m).

Figure 14:
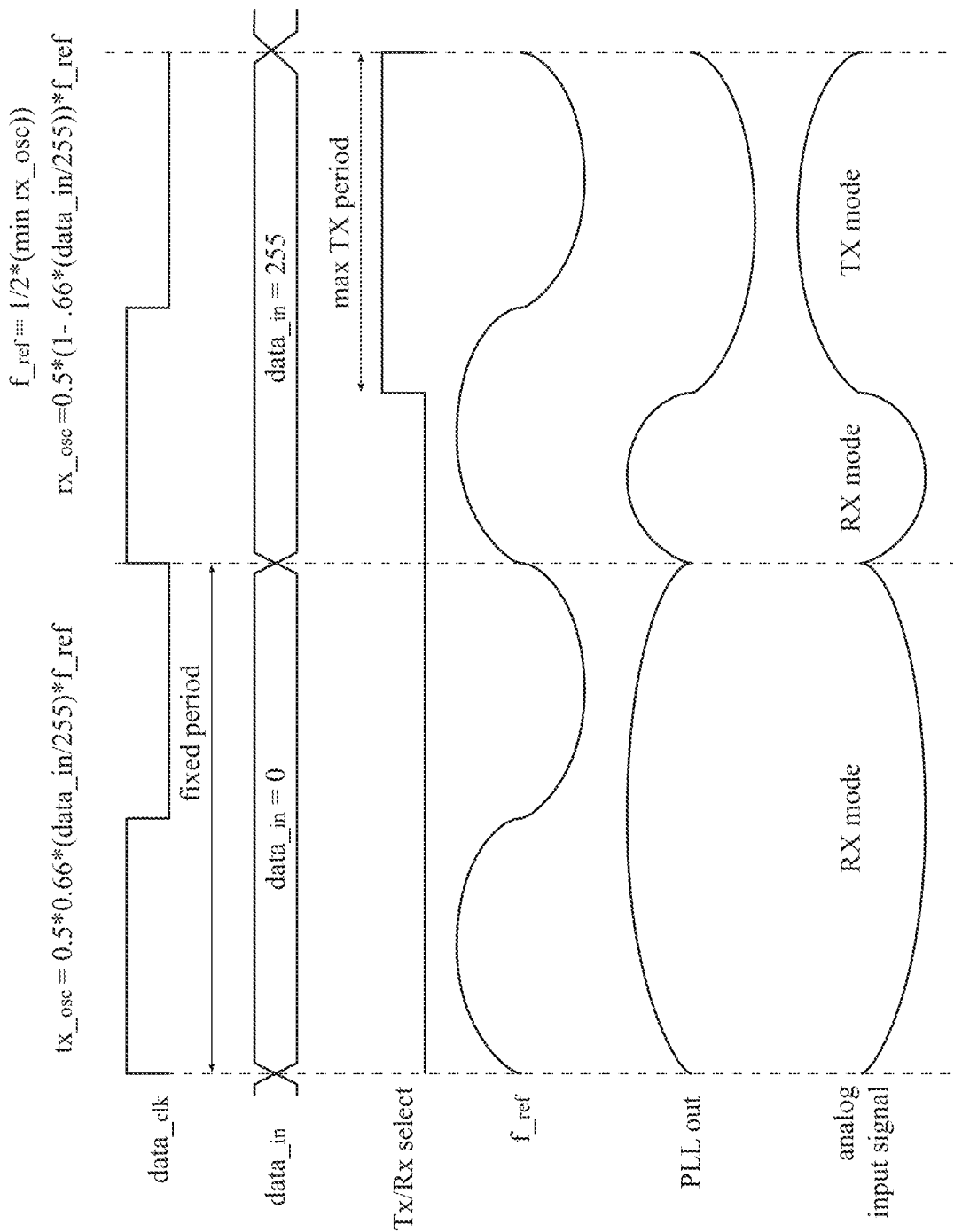
FIG. 14 is a schematic block diagram of signals of the mode enable module and transmit/receive drive module in accordance with the present invention.

FIG. 14 is a schematic block diagram of signals of mode enable module 122 and transmit/receive drive module 120 of FIG. 12. Data clock signal data_clk has a fixed period long enough to account for a max transmit time and a receive time of the input signal (e.g., data_in). Data_in is a digital input signal with a fixed period. For example, for a first clock cycle, data_in is equal to zero and for a second clock cycle data_in is equal to 255 (e.g., where 255 is a digital value for a max transmit pulse width or the highest intensity light output for the LED). Here, every clock cycle starts in a receive mode then transitions to a transmit mode if applicable to allow for transition delays.

Tx/Rx select signal is a high or low signal indicating a transmit mode (e.g., high) or a receive mode (e.g., low). For the first clock cycle, Tx/Rx select is in receive mode because the data_in signal is equal to zero. For the second clock cycle, the Tx/Rx select includes a receive portion and the max transmit (TX) period. If data_in signal is somewhere between 0 and 255, the transmit period will be shorter.

The oscillation reference signal (f_ref) is shown as a sinusoidal signal aligned with the data clock period. There may be one or more cycles of oscillation per data clock cycle. PLL module 150 is operable to generate a fixed period, varying half cycle oscillation based on the reference oscillation and the divider value set. The output of PLL module 150 (e.g., PLL out) is equal to f_ref*(n/m) as discussed previously.

For the first clock cycle, receive mode is selected and data_in equals 0 therefore, n is equal to the second receive divider value and m is the first second receive divider value.

The PLL output is a half cycle oscillation that is shown as an entirely positive value when in the receive mode. For the second clock cycle, data_in is 255 therefore, there is a receive mode selected first and a transmit mode selected second having a max transmit period. During the receive portion, the PLL output is a half cycle oscillation shown as positive and during the transmit mode the PLL output is a half cycle oscillation shown as negative. The PLL output undergoes a 180° phase shift in the oscillation conditioning circuit and is output as analog input signal as shown.

Figure 15:
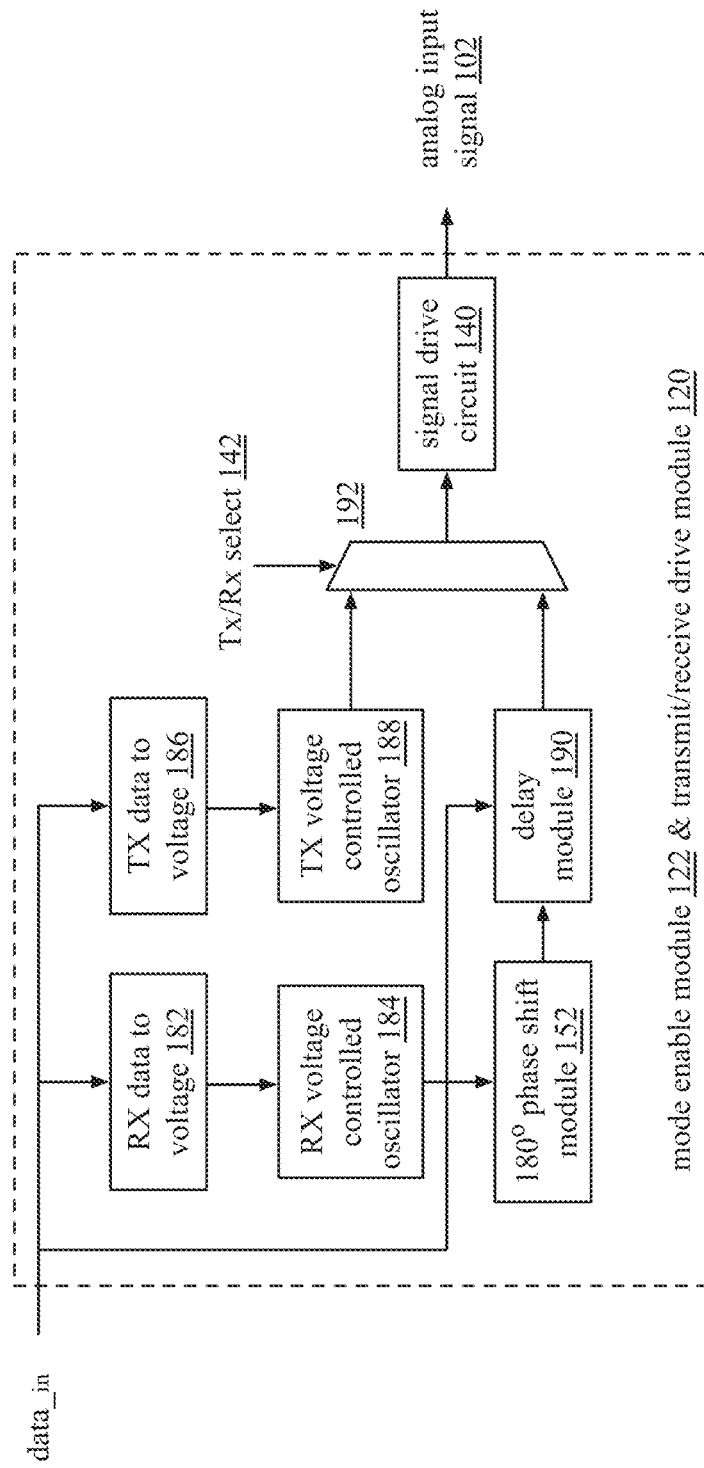
FIG. 15 is a schematic block diagram of another embodiment of the mode enable module and transmit/receive drive module in accordance with the present invention.

FIG. 15 is a schematic block diagram of another embodiment of the mode enable module 122 and transmit/receive drive module 120 that includes a receive (RX) data to voltage 182, an RX voltage controlled oscillator 184, a transmit (TX) data to voltage 186, a TX voltage controlled oscillator 188, 180° phase shift module 152, delay module 190, multiplexor 192, and signal drive circuit 140.

Data input signal (data_in) is input to RX data to voltage 182 and TX data to voltage 186. RX data to voltage 182 produces an RX voltage based on data_in and TX data to voltage 186 produces a TX voltage based on data_in. RX voltage controlled oscillator (VCO) 184 produces a receive sinusoidal waveform based on the RX voltage. TX voltage controlled oscillator (VCO) 188 produces a transmit sinusoidal waveform based on the TX voltage. Alternatively, an RX voltage to frequency converter and a TX voltage to frequency converter can be used in place of the RX and TX VCOs for better linearity over a wider range.

RX VCO 184 sends the receive sinusoidal waveform to 180° phase shift module 152 to invert the waveform. 180° phase shift module 152 sends the inverted receive sinusoidal waveform to the delay module 190 where the delay module 190 is controlled by the data_in signal.

Multiplexor 192 selects the transmit sinusoidal waveform or the inverted and delayed receive sinusoidal waveform based on a Tx/Rx select signal 142 and outputs the selected signal to signal drive circuit 140. Signal drive circuit 140 produces the analog input signal 102 based on the output of the multiplexor 192.

Figure 16:
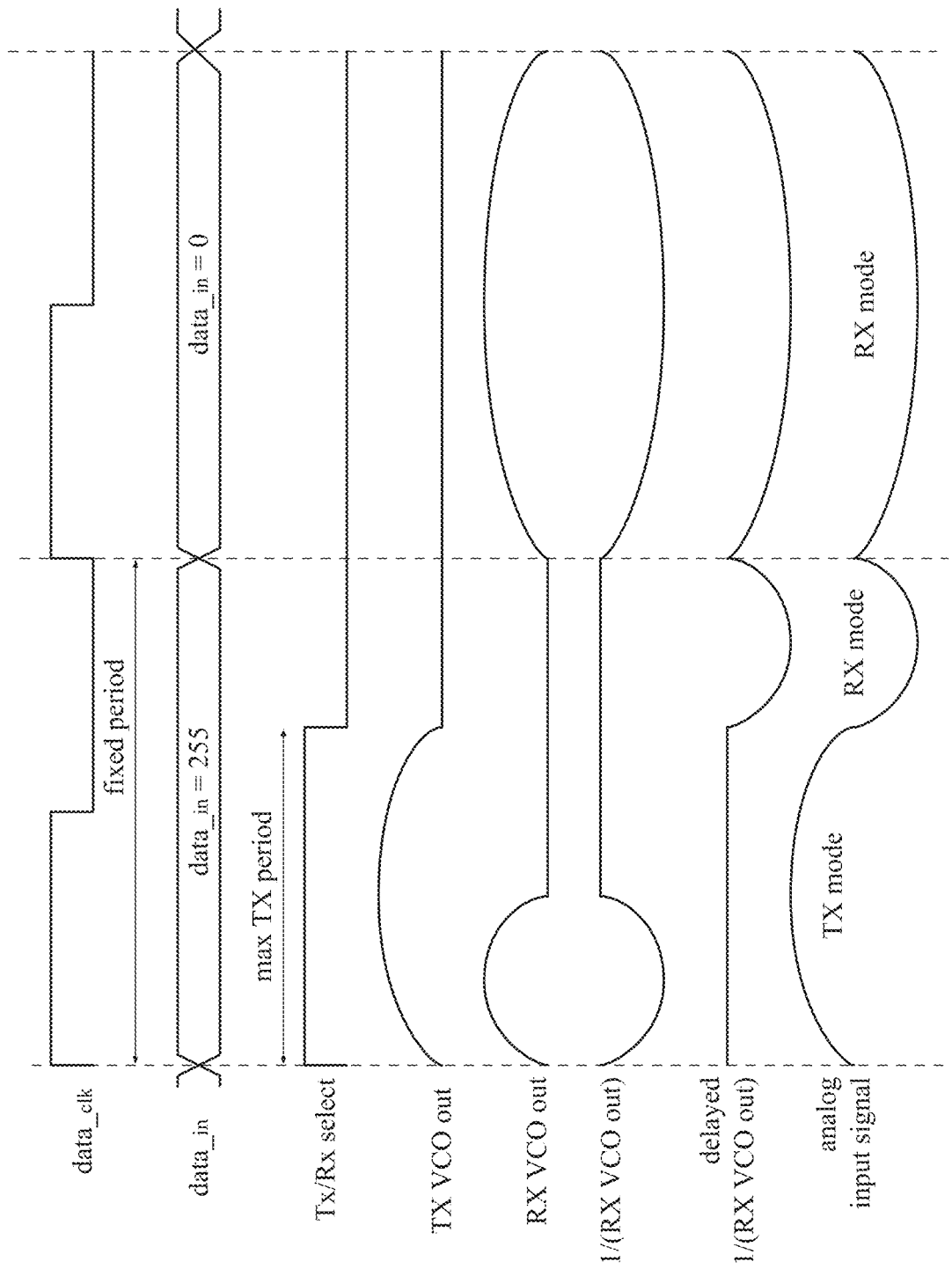
FIG. 16 is a schematic block diagram of signals of the mode enable module and transmit/receive drive module in accordance with the present invention.

FIG. 16 is a schematic block diagram of signals of mode enable module 122 and transmit/receive drive module 120 of FIG. 15. Data clock signal data_clk has a fixed period long enough to account for a max transmit time and a receive time of the input signal (e.g., data_in). Data_in is a digital input signal with a fixed period. For example, for a first clock cycle data_in, is equal to 255 (e.g., where 255 is a digital value for a max transmit pulse width or the highest intensity light output for the LED) and for a second clock cycle data_in is equal to zero. Due to the delay module 190 of FIG. 15, every clock cycle starts in a transmit mode then transitions to a receive mode if applicable.

Tx/Rx select signal is a high or low signal indicating a transmit mode (e.g., high) or a receive mode (e.g., low). For the first clock cycle, the Tx/Rx select indicates max transmit (TX) period and a receive portion. If the data_in signal was somewhere between 0 and 255, the transmit period will be shorter. For the second clock cycle, Tx/Rx select is in receive mode because the data_in signal is equal to zero.

The output of TX VCO 188 (e.g., TX VCO out) is a transmit sinusoidal waveform based on the TX voltage shown here as a positive waveform with a length equal to the max TX period. For all other times when the TX select is not indicated, TX VCO out is zero.

The output of RX VCO 184 (e.g., RX VCO out) is a receive sinusoidal waveform based on the RX voltage shown here as a positive waveform with a length equal to the time in the data clock cycle remaining after the max TX period. For the second clock cycle, data_in is equal to zero and RX select is indicated. As such, RX VCO out is shown as a positive waveform with a length equal to the full data clock period.

180° phase shift module 152 inverts RX VCO out as shown as 1/RX VCO out. The delay module 190 delays the 1/RX VCO out signal such that it occurs after the max transmit period as shown at delayed 1/RX VCO out. Signal drive circuit 140 outputs the TX VCO out waveform when Tx select is indicated and the delayed 1/RX VCO out waveform when RX mode is indicated. Thus, based on the Tx/Rx select signal indicated the analog input signal 102 is shown as a combination of TX VCO out and delayed 1/RX VCO.

Figure 17:
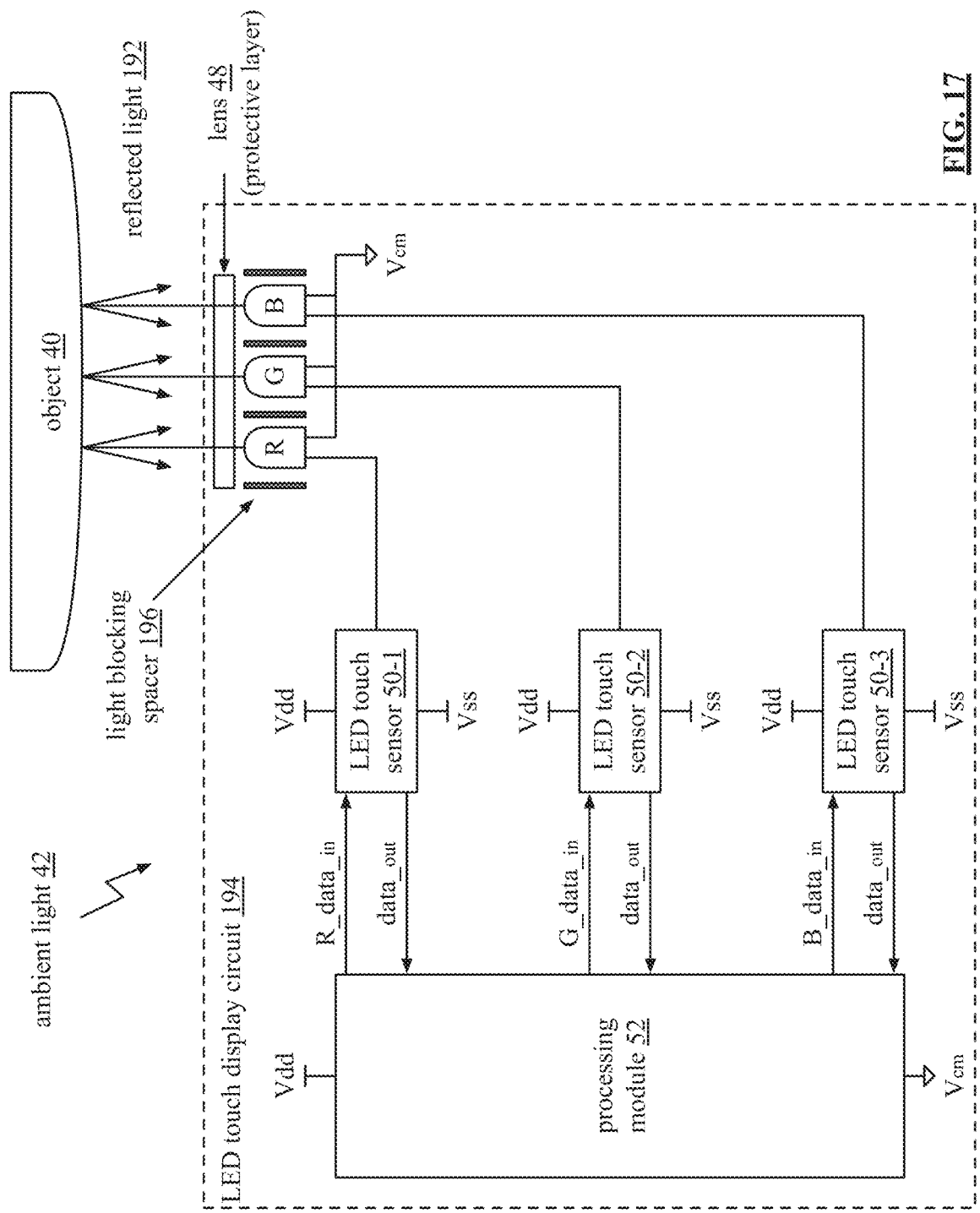
FIG. 17 is a schematic block diagram of a light emitting diode (LED) touch display circuit in accordance with the present invention.

FIG. 17 is a schematic block diagram of a light emitting diode (LED) touch display circuit 194 that includes two or more LEDs (e.g., a red (R) LED, a green (G) LED, and a blue (B) LED) separated by light blocking spacers 196, processing module 52, and a plurality of LED touch sensors 50-1 through 50-3 corresponding to the LEDs. Lens 48 includes one or more light distribution properties, light concentration properties, filters, color masks, and embedded text elements and serves as a protective layer for the LEDs.

LED touch display circuit 194 operates similarly to the LED touch display cell of FIG. 4 except for the addition of multiple LEDs, light blocking spacers 196, and corresponding LED touch sensors 50-1 through 50-3. With these additions, LED touch display circuit 194 operates each LED in both a transmit mode to emit light and a receive mode to sense light. Therefore, in addition to sensing ambient light as previously discussed, receive mode LEDs are operable to sense reflected light off of object 40 created by other LEDs in transmit mode.

In an example of operation, processing module 52 generates an input signal for each LED touch sensor 50_1 through 50_3 (e.g., R_data_in, G_data_in, and B_data_in). Each input signal is a repetitive signal that includes alternating transmit signal components and receive signal components. The transmit signal component determines that the is in transmit mode and also includes a value for light intensity. The receive signal component determines that the LED is in a receive mode.

When the transmit signal component is active, a corresponding LED touch sensor 50_1 through 50_3 forward biases its corresponding LED in accordance with a light intensity value (e.g., a pulse width modulation (PWM) mode signal) of the transmit signal component such that the corresponding LED emits light and illuminates lens 48. When the receive signal component is active, the corresponding LED touch sensor 50_1 through 50_3 reverse biases its LED such that the LED generates a current based on received light (e.g., ambient light 42, reflected light 192, and/or a combination of ambient light 42 and reflected light 192) and generates a digital representation of the current. The corresponding LED touch sensor 50_1 through 50_3 produces a digital representation of light intensity (e.g., data_Rx) based on the digital representation of the current.

As an example, the green and blue LEDs have different and longer transmit times (e.g., different PWM signals) than the red LED. When the red, green, and blue LEDs are in a receive mode, the LEDs sense ambient light 42 around the LED touch display cell 38. Light blocking spacers 196 block horizontal light detection between the LEDs and focus light upwards towards incoming objects for maximum reflection. Interactions (e.g., a touch, hover, hover and gesture, etc.) can be detected based on a varying distance 44 of an object 40 (e.g., finger, pen, etc.) from the LEDs and how that affects the amount of ambient light 42 received by the LEDs.

The red LED continues to detect reflected light 192 from the green and blue LEDS when they switch to transmit mode. When the object approaches the LEDs, the reflected light 192 increases. This combination of ambient light 42 and reflected light 192 detection helps further identify object 40 interactions (e.g., a touch, hover, hover and gesture, etc.) especially when ambient light levels are low. The processing module 52 interprets the digital representation of the light intensity to determine an output response 56 (e.g., touch, hover, etc.).

While green, red, and blue LEDs are shown here, other colors and/or types of LEDs may be chosen. For example, an infra-red LED may be used in the receive mode to detect light while visible spectrum LEDs are used for both receive and transmit modes.

In another embodiment, a touch, hover, and/or gesture is determined based on blurred image processing. In a non-lensed embodiment, light is not focused sharply on the LEDs. As such, a 2D image from the LEDs is fuzzy (low frequency) and has indistinct edges. As an object approaches the LEDs, the blur lessens and the image becomes sharper. When contact is made by an object on the LEDs, there is a sharper transition between the blocked LEDs and unblocked LEDs around the perimeter of the object, which can generally be recognized because there is a cluster of LEDs that is blocked. A variety of algorithms can be used to detect the object and properties thereof (i.e., looking for the least blur and/or the maximum sharpness).

In an example, a contrast method is used in the time domain. The image created by the LEDs in receive and/or transmit mode is analyzed for highest contrast. A blurred image has low contrast. As the image becomes sharper (e.g., as an object approaches the LEDS), the contrast increases. Maximum contrast occurs when a physical touch is made (contrast is high around the sharper boundaries).

In another example, a high frequency method is used in the frequency domain. In this method, Fourier analyses is used to determine frequency components of the blurred image produced by the LEDs. When there is no reflected light (e.g., no object nearby), the frequency spectrum of the blurred image includes low frequency components with very few, if any, high frequency components. As an object comes closer to the LEDS, edges become sharper which means there are an increase in high and/or higher frequency components (more frequency components in general). In a specific example, the high contrast edges are like a rising pulse which contains many higher frequency components. The maximum number of high frequency components occur at the point of contact.

FIG. 18 is a schematic block diagram of an example of transmit and receive select signals of light emitting diodes (LEDs) of FIG. 17. Transmit-receive (Tx-Rx) signal contains a transmit mode component and a receive mode component (e.g., a high signal indicates a transmit mode, and a low signal indicates a receive mode). During one clock cycle, LEDs are in transmit mode no longer than the max transmit mode then switch to receive mode at different times. For example, a max transmit period is equal to 255 (e.g., where 255 is a digital value for a max transmit pulse width or the highest intensity light output for the LED).

The digital value of 255 comes from hypertext markup language (HTML) color codes where various colors are created (e.g., transmitted) based on red, green, and blue light intensity levels. For example, white light is created when red, green, and blue light are equal to 255 max intensity. As another example, for turquoise light, red is equal to 64, green is 224, and blue is 228. Over 16 million color combinations exist.

In this example, the blue LED has a max transmit period equal to 255 while green and red have shorter transmit periods. When the red LED's transmit period is over, red senses blue and green reflected light as well as ambient light for a period of time while the green and blue LED are still in transmit mode. When the green LED's transmit period is over, the red and green LED sense blue reflected light as well as ambient light while the blue LED is still in transmit mode. When the blue LED's transmit period is over, all three LEDs are in receive mode and sense ambient light as discussed with previous Figures.

FIGS. 19A-19B depict graphs of light 198 versus object distance 200 from the LED touch display circuit. As shown in FIG. 19A, the light measurement includes a reflected light component 192 and an ambient light component 42. The max ambient light level occurs when objects are further away from the LED touch display circuit (e.g., at a greater distance 200) such that ambient light is not obstructed. Conversely reflected light levels increase when objects are closer to the LED touch display circuit.

When all LEDs are in the receive mode the ambient light 42 curve is used to detect interactions. For example, an ambient light hover threshold 202 is defined as being between an ambient light level associated with a distance d2 from the LED touch display circuit and an ambient light level associated with a distance d1 from the LED touch display circuit. The level of ambient light associated with a distance d2 is at a higher intensity than the ambient light level associated with a distance d1 and distance d2 is further from the LED touch cell surface than d1.

An ambient touch threshold 204 is defined as being between a level of ambient light associated with a distance d1 and zero ambient light at a distance zero. The processing module processes the digital representation of the light intensity to determine an ambient light pattern and is able to determine a hover indication when the ambient light pattern deviates from the maximum ambient light level to the ambient light hover threshold 202. The processing module can then process the hover indication to generate the response output. The processing module processes the digital representation of the light intensity to determine an ambient light pattern and is able to determine a touch indication when the ambient light pattern deviates from the max ambient light or the ambient light hover threshold 202 to the ambient touch threshold 204. The processing module can then process the touch indication to generate the response output.

As shown in FIG. 19B, when at least some LEDs are in transmit mode, a combination of the reflected light curve 192 and the ambient light curve is used to detect interactions. The combined light curve 206 is an approximation of combined light when maximum reflected light is much greater than maximum ambient light (e.g., the ambient light is moderate to low).

For example, a combination light hover threshold 210 is defined as being between a combined light level associated with a distance d2 from the LED touch display circuit and a combined light level associated with a distance d1 from the LED touch display circuit. The level of combined light associated with a distance d2 is at a lower intensity than the combined light level associated with a distance d1 and distance d2 is further from the LED touch display surface than d1.

A combination touch threshold 208 is defined as being between a level of combined light associated with distance d1 and a maximum light at a distance zero. The processing module processes the digital representation of the light intensity to determine a light pattern and based on whether at least some LEDs are in transmit mode is able to determine a hover indication when the light pattern indicates the combined light hover threshold 210.

The processing module can then process the hover indication to generate the response output. The processing module is able to determine a touch indication when the light pattern indicated the combination touch threshold 208. The processing module can then process the touch indication to generate the response output.

FIG. 20 is a logic diagram of an example of a method of light based touch detection by a light emitting diode (LED) touch display circuit. For example, LED touch display circuit includes a first LED coupled to a first LED touch sensor and a second LED coupled to a second LED touch sensor where the first LED and a second LED are separated by light blocking spacers. The LED touch display circuit can include more than two LEDs (e.g., a red LED, a green LED, and a blue LED).

The method begins with step 212 where a processing module of the LED touch display circuit generates a data input signal in accordance with a sample clock rate. For example, the sample clock rate is 1/50 microseconds or 20 KHz. The method continues with step 214 where the first and second LED touch sensor of the LED touch display circuit convert the data input signal into first and second LED signals (e.g., transmit-receive signals). The first LED signal includes a first transmit signal component and a first receive signal component and the second LED signal includes a second transmit signal component and a second receive signal component.

When in an ambient light sense mode, the method continues with steps 84-94 of FIG. 7 for each of the first and second LED. For example, the first LED touch sensor receives a first current from the first LED and the second LED touch sensor receives a second current from the second LED. The first LED touch sensor generates first digital representations of the first current from the first LED and the second LED touch sensor generates second digital representations of the second current from the second LED.

The first LED touch sensor generates first digital representations of first light intensity from the first digital representations of current and the second LED touch sensor generates second digital representations of second light intensity from the second digital representations of the second current. The first and second LED touch sensors send the first digital representations of first light intensity and the second digital representations of second light intensity to the processing module. The processing module processes the first and second digital representations of first and second light intensity to determine an ambient light pattern and interprets the ambient light pattern to determine an interaction (e.g., hover, touch, gesture, etc.).

When in a combined light sense mode (e.g., ambient light and reflected light are sensed), the method continues with step 218 where during at least a portion of the first receive signal component and at least a portion of the second transmit signal component (e.g., the second transmit period is still going while the first receive component begins), the first LED touch sensor receives the first current from the first LED.

The method continues with step 220 where the first LED touch sensor generates first digital representations of the first current from the first LED. The method continues with step 222 where the first LED touch sensor generates first digital representations of first light intensity from the first digital representations of the first current.

The method continues with step 224 where the first LED touch sensor sends the first digital representations of the first light intensity to the processing module. The method continues with step 226 where the processing module processes the first digital representations of the first light intensity to determine a combined light pattern. The combined light pattern is representative of ambient light and reflected light emitted from the second LED.

The method continues with step 228 where the processing module interprets the combined light pattern to determine an interaction (e.g., touch, hover, gesture, etc.). For example, a combination light hover threshold is defined as being between a combined light level associated with a distance d2 from the LED touch display circuit and a combined light level associated with a distance d1 from the LED touch display circuit. The level of combined light associated with a distance d2 is at a lower intensity than the combined light level associated with a distance d1 and distance d2 is further from the LED touch display surface than d1. The combined light pattern can be processed to determine a hover interaction based on the combination hover threshold.

A combination touch threshold is defined as being between a level of combined light associated with distance d1 and a maximum light at a distance zero from the LED touch display surface. The combined light pattern can be processed to determine a touch interaction based on the combination touch threshold.

The method continues with step 230 where the processing module processes the interaction to generate a response output. For example, a tap, swipe, length of touch/hover, and/or or other such gesture may be identified and processed to perform various actions (e.g., power on/off, volume change, lighting change, etc.). A hover interaction may be determined and then the processing module waits for further gesture information.

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A data drive input circuit comprises:
   a pulse width modulation (PWM) module operable to generate a PWM signal based on input data and a clock signal;
   a mode enable module operable to:
      establish a light emitting diode (LED) transmit mode of a mode signal when the PWM signal is in a first state; and
      establish an LED receive mode of the mode signal when the PWM signal is in a second state; and
   a transmit/receive drive module operable to:
      generate a transmit data signal component of an analog input signal based on the PWM signal and the LED transmit mode;
      generate a receive signal component of the analog input signal based on the PWM signal and the LED receive mode; and output the analog input signal, wherein the transmit data signal component is operable to drive an LED when the LED transmit mode is active, wherein the transmit data signal causes the LED to emit light, wherein the receive signal component is affected by light received by the LED, and wherein the effect on the receive signal component is representative of light being received by the LED.

2. The data drive input circuit of claim 1, wherein the PWM module comprises:
   a digital to analog converter operable to convert the input data into an analog data signal;
   a sawtooth generator operable to generate a sawtooth waveform in accordance with the clock signal; and
   an operational amplifier operable to generate the PWM signal based on the analog data signal and the sawtooth waveform.

3. The data drive input circuit of claim 1, wherein the mode enable module and the transmit/receive module comprise:
   a multiplexor operable to output one of a transmit voltage or a receive voltage based on the PWM signal; and
   a signal drive circuit operable to produce the analog input signal based on the output of the multiplexer.

4. The data drive input circuit of claim 1, wherein the mode enable module and the transmit/receive module comprise:
   a data to divider module operable to generate a divider value set based on the input data;
   a phase locked loop operable to generate a fixed period, varying half cycle oscillation based on a reference oscillation and the divider value set; and
   an oscillation conditioning circuit operable to generate the analog input signal based on the fixed period, varying half cycle oscillation.

5. The data drive input circuit of claim 4, wherein the data to divider module comprises:
   a transmit divider generator to generate a transmit divider value set based on the input data;
   a receive divider generator to generate a receive divider value set based on the input data; and
   a multiplexor module operable to output the transmit divider value set or the receive divider value set based on the PWM signal to produce the divider value set.

6. The data drive input circuit of claim 4, wherein the oscillation conditioning circuit comprises:
   a phase shift module to invert the fixed period, varying half cycle oscillation to produce an inverted oscillation cycle; and
   a signal drive circuit operable to produce the analog input signal based on the inverted oscillation cycle.

7. The data drive input circuit of claim 1, wherein the mode enable module and the transmit/receive module comprise:
   a transmit data to voltage converter operable to produce a transmit voltage based on the input data;
   a transmit voltage controlled oscillator operable to produce a transmit sinusoidal waveform based on the transmit voltage;
   a receive data to voltage converter operable to produce a receive voltage based on the input data;
   a receive voltage controlled oscillator operable to produce a receive sinusoidal waveform based on the receive voltage;
   a phase shift module operable to invert the receive sinusoidal waveform to produce an inverted receive sinusoidal waveform;
   a delay module operable to delay the inverted receive sinusoidal waveform to produce a delayed and inverted receive sinusoidal waveform;
   a multiplexer operable to select the transmit sinusoidal waveform or the delayed and inverted receive sinusoidal waveform sinusoidal waveform based on the PWM signal; and
   a signal drive circuit operable to produce the analog input signal based on the output of the multiplexer.

* * * * *